(12) United States Patent
Fallows et al.

(10) Patent No.: US 9,154,485 B1
(45) Date of Patent: Oct. 6, 2015

(54) AUTHENTICATION REVALIDATION

(71) Applicant: Kaazing Corporation, Mountain View, CA (US)

(72) Inventors: John R. Fallows, Palo Alto, CA (US); Steven R. Atkinson, Morgan Hill, CA (US)

(73) Assignee: Kaazing Corporation, San Jose, CA (US)

( * ) Notice: Subject to any disclaimer, the term of this patent is extended or adjusted under 35 U.S.C. 154(b) by 34 days.

(21) Appl. No.: 13/837,494

(22) Filed: Mar. 15, 2013

(51) Int. Cl.
*H04L 29/06* (2006.01)
*G06F 21/31* (2013.01)

(52) U.S. Cl.
CPC ............... *H04L 63/08* (2013.01); *G06F 21/31* (2013.01); *H04L 63/108* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,711,136 B1* | 3/2004 | Schneider et al. | 370/249 |
| 2008/0127323 A1* | 5/2008 | Soin et al. | 726/12 |
| 2011/0010543 A1* | 1/2011 | Schmidt et al. | 713/168 |
| 2012/0207088 A1* | 8/2012 | Liu et al. | 370/328 |
| 2013/0067102 A1* | 3/2013 | Paller et al. | 709/228 |
| 2013/0152175 A1* | 6/2013 | Hromoko et al. | 726/5 |
| 2013/0232223 A1 | 9/2013 | Chen Ma | |
| 2014/0026187 A1* | 1/2014 | Johnson et al. | 726/3 |
| 2014/0056313 A1* | 2/2014 | Wada | 370/463 |
| 2014/0201388 A1 | 7/2014 | Dajani et al. | |

OTHER PUBLICATIONS

Author: I. Fette "The Websocket Protocol"; Publisher: Isode Ltd.; ISSN: 2070-1721; Date: Dec. 2011; pp. 1-71.*

* cited by examiner

*Primary Examiner* — Harunur Rashid
*Assistant Examiner* — Andrew Steinle
(74) *Attorney, Agent, or Firm* — Van Pelt, Yi & James LLP

(57) ABSTRACT

A WebSocket connection is established. The WebSocket connection was established with a requester of the connection. The authentication of the requester is configured to expire. A request to revalidate the authentication is provided. An update of the authentication is received. The update of the authentication is received without disconnecting the WebSocket connection.

20 Claims, 9 Drawing Sheets

AUTHENTICATION REVALIDATION

BACKGROUND OF THE INVENTION

The WebSocket protocol enables traditional half-duplex Hypertext Transfer Protocol (HTTP) or HTTP over SSL (HTTPS) communication to be upgraded to a bi-directional, full-duplex communication channel over a Transmission Control Protocol (TCP) connection. The WebSocket protocol has been standardized by the Internet Engineering Task Force (IETF) standards organization as RFC 6455. The WebSocket protocol, as standardized, was intended to be a generalized protocol and may lack extended functionality that may be desired by a user. One example of desired extended functionality arises in situations where authentication of a client connected via a WebSocket connection to a server is only valid for a limited amount of time. Once the validity of the authentication expires, typically the WebSocket connection is dropped and the client is required to establish a new connection with newly valid authentication to resume communication. This is highly disruptive for communication that requires a steady streaming of data between the client and server. Therefore, there exists a need for an improved way to revalidate authentication of a communication party.

BRIEF DESCRIPTION OF THE DRAWINGS

Various embodiments of the invention are disclosed in the following detailed description and the accompanying drawings.

DETAILED DESCRIPTION

Figure 1:
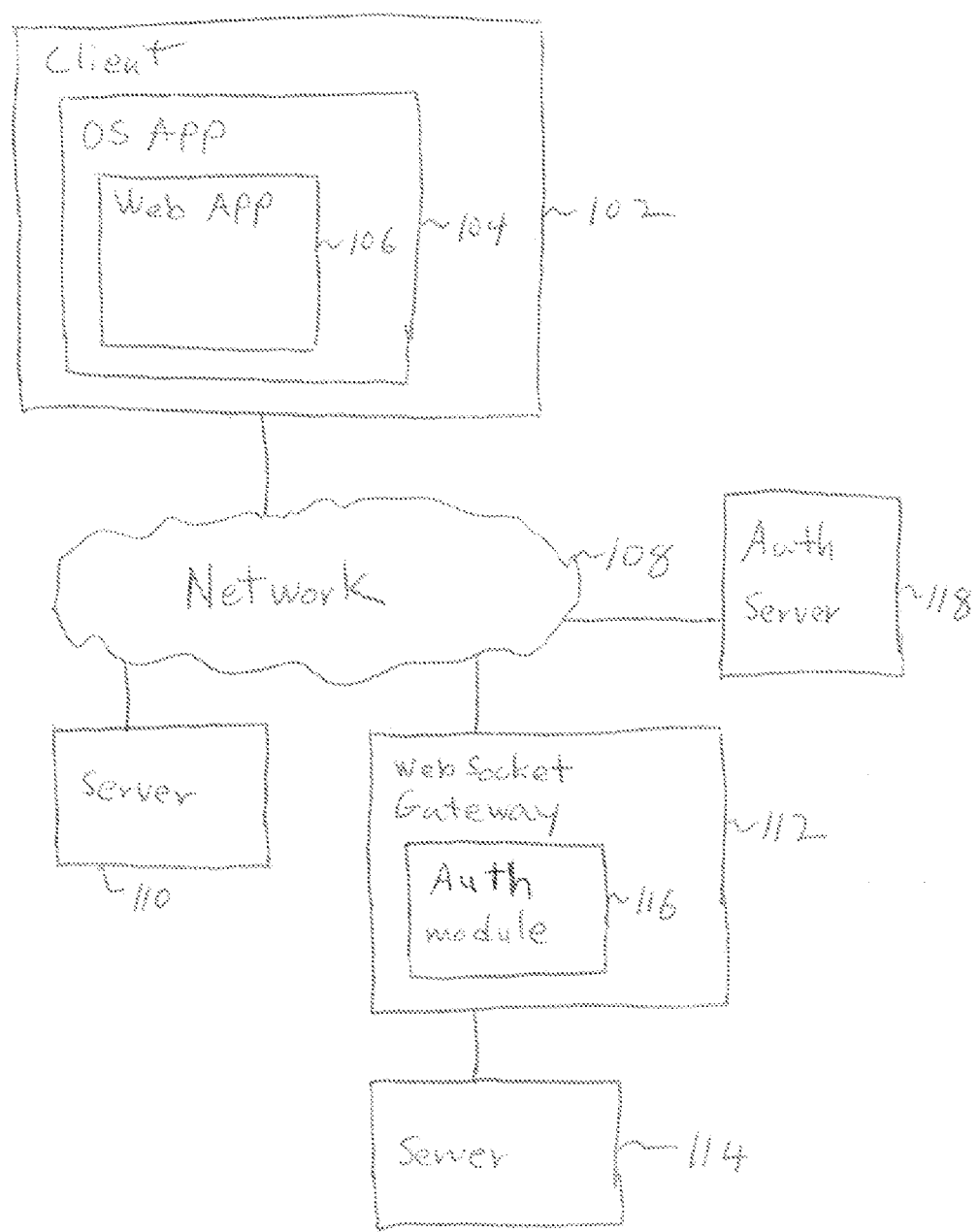
FIG. 1 is a diagram illustrating an example WebSocket communication environment.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The WebSocket protocol has been standardized by the Internet Engineering Task Force (IETF) standards organization as RFC 6455 (available at http://tools.ietf.org/html/rfc6455). RFC 6455 includes details on the initialization handshake and data framing of the WebSocket protocol. As specified in RFC 6455, once a WebSocket connection has been established using the handshake process between at least two communicating nodes, WebSocket communication is performed by transmitting WebSocket frames. A high-level overview of bits contained in a WebSocket frame is given in the following table reproduced from RFC 6455.

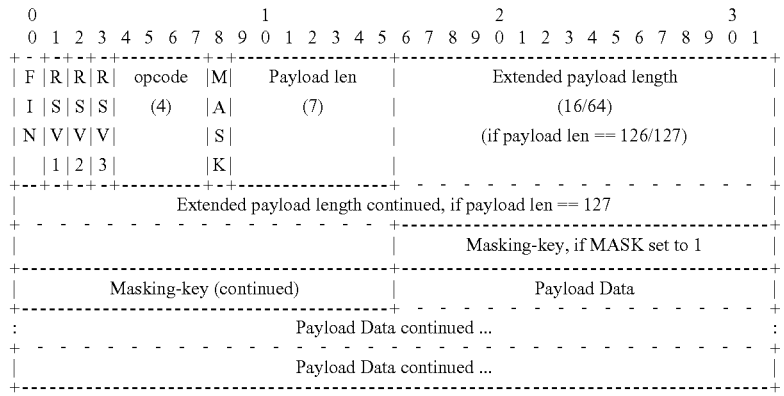

As shown above, the beginning portions of a WebSocket frame include metadata information regarding configuration of data contained in the WebSocket frame. Additional details on the groups of bits in the WebSocket frame may be found in RFC 6455. The ending section of the WebSocket frame includes the actual payload data (e.g., application level data). The location of the payload data within the WebSocket frame may vary depending on the size of the payload data and whether a masking key is utilized. WebSocket frames are base units of communication data framing in WebSocket communication. By default, the WebSocket protocol may use port 80 for regular WebSocket connections and port 443 for WebSocket connections tunneled over Transport Layer Security (TLS).

In some embodiments, a WebSocket frame that includes a control message is sent. After a WebSocket connection is established between communication parties, communication between them is achieved using WebSocket frames. Each frame includes a metadata portion and a payload data portion. The metadata portion may include data specifying predetermined configuration/functionality as specified in the adopted standard of the WebSocket protocol. Because the metadata portion is of a predetermined size and most of the bits of the metadata portion are already committed to existing functionality, it is not efficient to utilize the metadata portion to extend the functionality of the WebSocket protocol. The payload data portion of the WebSocket frame traditionally contains application level data that is intended to be passed to an end destination application. In some embodiments, the payload data portion of a WebSocket frame is utilized to include a control message that is processed in a different manner as compared to a normal WebSocket frame that does not include the control message. For example, a WebSocket frame that includes a control message specifies an instruction on how to process and/or communicate subsequent normal WebSocket frames. A WebSocket frame may be identified as including a control message by placing a control byte sequence within the payload data portion of the WebSocket frame. When normal payload data (e.g., end destination application level data) without a control message is sent in a WebSocket frame, the control byte sequence is not included in the payload data portion of the frame. By not dedicating a fixed amount of bits in the WebSocket frame for the control byte sequence, the bandwidth overhead required to implement the control message is reduced.

Revalidating authentication is disclosed. In some embodiments, a WebSocket connection is established with a requester of the connection, wherein an authentication of the requester is configured to expire. Establishing the WebSocket connection may include initializing a control message that can be used to indicate a request to provide an updated authentication. An indication to revalidate the authentication is provided. For example, before the authentication is set to expire, the control message is sent via the WebSocket connection to a client to request the client to provide an updated authentication credential. An update of the authentication is received without disconnecting the WebSocket connection. For example, an updated authentication credential is received via a communication connection different from the already established Web Socket connection.

FIG. 1 is a diagram illustrating an example WebSocket communication environment. Client 102 is connected to server 110 and WebSocket gateway 112 via network 108. Server 114 may be accessed by client 102 via WebSocket gateway 112. Examples of client 102 include a computer, a tablet device, a smartphone, and any computing device. Client 102 may be used by a user to access services and/or content at least in part provided by server 110 and/or server 114. For example, server 110 hosts web content that is obtained by client 102. Any type of data and service may be provided by server 110 and server 114. In some embodiments, an HTTP/HTTPS connection between client 102 and server 110 is requested by client 102 to be upgraded to a WebSocket connection. In some embodiments, a stream of a SPDY protocol connection is requested to be upgraded to a WebSocket connection. In various embodiments, other protocol such as SPDY may be utilized on top of an established WebSocket connection. Server 110 may handle the request and communicate with client 102 using the WebSocket protocol. In some embodiments, a WebSocket upgrade request received by server 110 is forwarded to WebSocket gateway 112 for handling. WebSocket gateway 112 may handle WebSocket upgrade requests, a WebSocket initialization handshake, and handling of WebSocket communication for server 110. In some embodiments, once a WebSocket upgrade request received by server 110 is forwarded to WebSocket gateway 112 for handling, data/services provided using the WebSocket protocol may be handled by to WebSocket gateway 112 for server 110.

Authentication server 118 provides authentication credentials via network 108 to one or more components of client 102, server 110, gateway 112 and/or server 114. For example, authentication server 118 provides a token, an HTTP cookie, a key, a certificate and/or other authentication/identification/access control data to one or more components of client 102 to authorize client 102 to access data and/or services (e.g., data/services of server 110, gateway 112 and/or server 114). In some embodiments, authentication provided by authorization server 118 is limited in duration. For example, an obtained authorization is only valid for a limited duration and must be renewed to maintain the authorization. In another example, an obtained authorization can be dynamically revoked and may be renewable. In some embodiments, authorization server 118 provides a single sign-on (i.e., SSO) service.

In some embodiments, an HTTP or HTTPS connection between client 102 and server 114/WebSocket gateway 112 is requested by client 102 to be upgraded to a WebSocket connection. WebSocket gateway 112 enables content and/or services provided by server 114 to be accessed via a WebSocket protocol. For example, WebSocket gateway 112 handles WebSocket upgrade requests, a WebSocket initialization handshake, and handling of WebSocket frames for server 114. WebSocket gateway 112 may proxy communication between client 102 and server 114, at least in part by allowing WebSocket gateway 112 to encode communication sent by server 114 into WebSocket frames to be sent to client 102 and decoding received by WebSocket frames from client 102 into a data format desired by server 114. By utilizing WebSocket gateway 112, server 114 can take advantage of the WebSocket protocol without the need to directly implement the entire WebSocket protocol.

Client 102 includes operating system level application (OS App) 104. OS App 104 is at least in part hosting (e.g., at least in part executing) web application 106. For example, OS App 104 is a web browser and web application 106 is a Javascript application executed using the web browser. In another example, OS App 104 is a mobile device application and web application 106 is a component of the mobile device application. Other examples of OS App 104 include any application executing on an operating system hosted by client 102. In some embodiments, protocol level processing of WebSocket communication is handled by OS App 104 for web application 106. For example, when a WebSocket connection is requested by web application 106, OS App 104 handles the handshake, protocol control, protocol configuration, and WebSocket frame and message processing to allow only the web application level data contained in a payload portion of a WebSocket frame to be sent to web application 106. In some embodiments, web application 106 may process select sets of WebSocket control configurations.

WebSocket gateway 112 includes authorization module 116. Authorization module 116 controls access to data and/or services of gateway 112, server 110 and/or server 114. For example, client 102 provides an authorization token obtained from authorization server 118 to gateway 112 and authorization module 116 validates the received authorization token to determine whether client 102 is allowed to access data/service provided via gateway 112. In some embodiments, authorization module 116 and/or another component of gateway 112 communicates with authorization server 118 and/or another authorization component via network 108 to authorize client 102 access data and/or service. For example, an authorization credential provided by client 102 to gateway 112 is authenticated with authorization server 118.

Examples of network 108 include one or more of the following: a direct or indirect physical communication connection, mobile communication network, Internet, intranet, Local Area Network, Wide Area Network, Storage Area Network, and any other form of connecting two or more systems, components, or storage devices together. In various embodiments, the components shown in FIG. 1 may exist in various combinations of hardware machines. One or more of the components shown in FIG. 1 may be included in the same machine. Other communication paths may exist and the example of FIG. 1 has been simplified to illustrate the example clearly. Although single instances of components have been shown to simplify the diagram, additional instances of any of the components shown in FIG. 1 may exist. For example, multiple clients may be communicating with multiple servers that may be utilizing multiple WebSocket gateways. Additional OS applications and web applications may be hosted by client 102. Components not shown in FIG. 1 may also exist.

Figure 2:
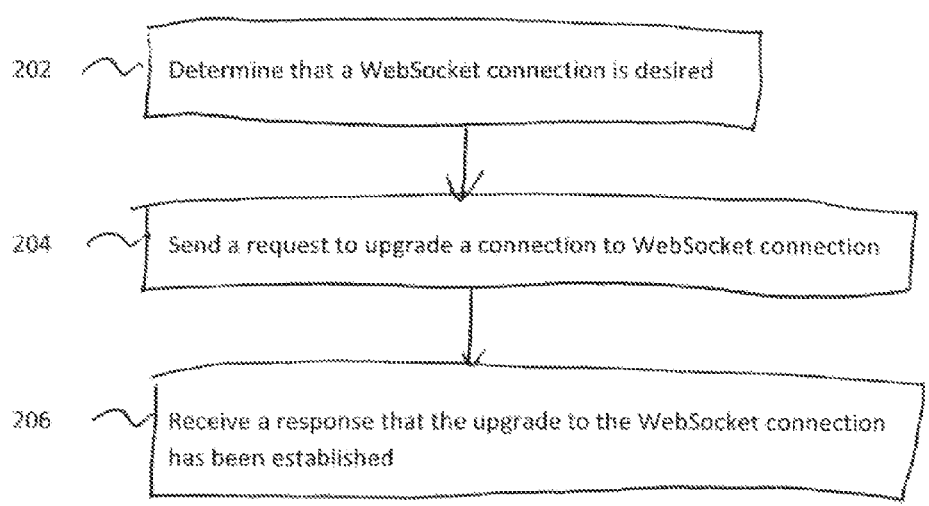
FIG. 2 is a flowchart illustrating an embodiment of a process for requesting a WebSocket connection.

FIG. 2 is a flowchart illustrating an embodiment of a process for requesting a WebSocket connection. The process of FIG. 2 may be implemented on one or more components of client 102 of FIG. 1. At 202, it is determined that a WebSocket connection is desired. In some embodiments, determining that the WebSocket connection is desired includes receiving a request (e.g., from an application such as web application 106 of FIG. 1) that a WebSocket connection is desired. In some embodiments, determining that the WebSocket connection is desired includes detecting that a WebSocket connection is desired. In some embodiments, determining that the WebSocket connection is desired is associated with visiting a website, launching an application, and/or a request to obtain content available via a WebSocket connection. The determination that a WebSocket connection is desired may be associated with an existing HTTP/HTTPS connection that is to be upgraded to a WebSocket connection. In some embodiments, the determination that a WebSocket connection is desired is made by an operating system level application such as OS application 104 of FIG. 1. For example, a web application running on a web browser signals to the web browser that an HTTP/HTTPS connection is to be upgraded to a WebSocket connection. In another example, when an application such as a mobile application is launched, an HTTP/HTTPS connection to a server is initialized and it is determined that the HTTP/HTTPS connection is to be upgraded to a WebSocket connection.

At 204, a request to upgrade a connection to a WebSocket connection is sent. The request may be sent to a server of the connection such as server 110, server 114 and/or WebSocket gateway 112 of FIG. 1. In some embodiments, sending the request includes initializing a WebSocket handshake to upgrade the connection. The connection may be an already established HTTP/HTTPS connection and/or a new HTTP/HTTPS connection established in response to the determination made at 202. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the request to update the connection is managed by an operating system level application such as OS application 104 of FIG. 1. In some embodiments, sending the request includes initializing an opening handshake as specified in the WebSocket standard. In some embodiments, the request includes identification of one or more capabilities of a client that are not directly specified in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request to utilize a control message regarding a specified extended capability not directly implemented by the WebSocket protocol standard. In some embodiments, the request to initialize the control message includes one or more configurations associated with utilizing the control message.

At 206, a response that the upgrade to the WebSocket connection has been established is received. The response may be sent to a client by a server such as server 110, server 114 and/or WebSocket gateway 112 of FIG. 1. In some embodiments, receiving the response includes receiving a response to a WebSocket handshake upgrade request sent in 204. In some embodiments, the request to update the connection is received by an operating system level application such as OS application 104 of FIG. 1 and the operating system level application informs a hosted application such as web application 106 that the WebSocket connection has been established. In some embodiments, receiving the response includes completing an opening handshake as defined in the WebSocket standard. In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence.

Figure 3:
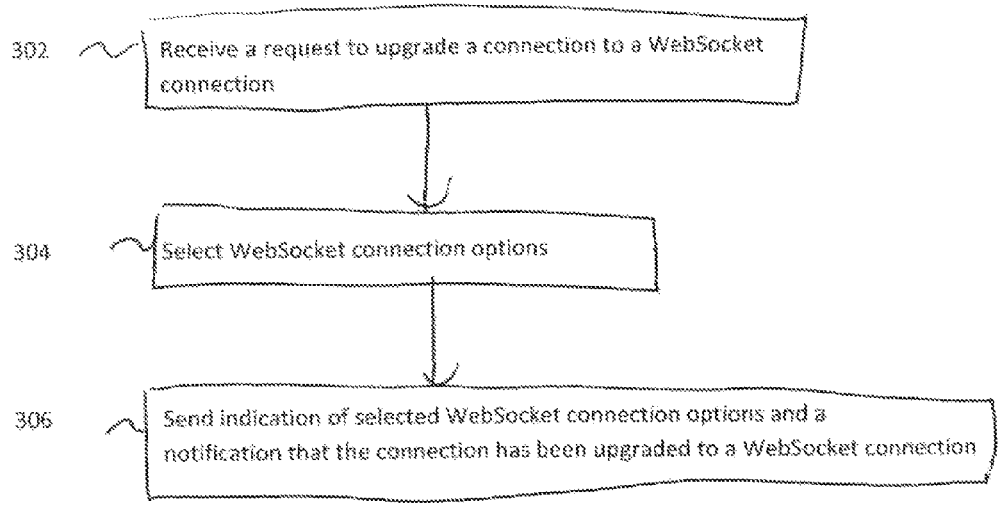
FIG. 3 is a flowchart illustrating an embodiment of a process for confirming a request to establish a WebSocket connection.

FIG. 3 is a flowchart illustrating an embodiment of a process for confirming a request to establish a WebSocket connection. The process of FIG. 3 may be implemented on one or more components of server 110, server 114 and/or Web- Socket gateway 112. At 302, a request to upgrade a connection to a WebSocket connection is received. In some embodiments, the request is associated with visiting a website, launching an application, and/or a request to obtain content available via a WebSocket connection. In some embodiments, the request was made by an operating system level application such as OS application 104 of FIG. 1. For example, a web browser has made the request in response to a web application running on the web browser that has requested the WebSocket connection. In another example, when an application such as a mobile application is launched, an HTTP/HTTPS connection to a server for the mobile application is initialized and a request to upgrade the HTTP/HTTPS connection is sent to the server. In some embodiments, the request received at 302 includes the request sent at 204 of FIG. 2.

In some embodiments, the request is associated with initializing a WebSocket handshake to upgrade the connection. The connection may be an already established HTTP/HTTPS connection and/or a new HTTP/HTTPS connection established in response to the determination made at 202 of FIG. 2. For example, the opening handshake is intended to be compatible with HTTP/HTTPS-based server-side software and intermediaries, so that a single port can be used by both HTTP/HTTPS clients talking to that server and WebSocket clients talking to that server. In some embodiments, the received request initializes an opening handshake as described in the WebSocket standard. In some embodiments, the request includes identification of one or more capabilities of a client that are not directly implemented in the WebSocket protocol standard. For example, the request includes one or more identifiers of one or more extended capabilities of the WebSocket protocol that are supported by a client sending the request. In some embodiments, the request includes a request to initialize support for an extended capability that is able to be controlled using a control message. For example, the request includes a request that utilizes a control message regarding a specified extended capability not directly implemented by the WebSocket protocol standard. In some embodiments, the request to initialize the control message includes one or more configurations associated with utilizing the control message. In some embodiments, the configuration of the control message includes a configuration specifying which one or more communication parties are allowed to utilize the control message. For example, only a client side communication party, not a server-side communication party, of a WebSocket connection is configured to utilize a control message that enables specification of a desired communication rate. In some embodiments, different control messages may be associated with different configurations of allowed communication parties that are allowed to utilize the control message.

At 304, WebSocket connection options are selected. In some embodiments, selecting the WebSocket connection options includes configuring the WebSocket connection and/or options associated with the WebSocket connection. In some embodiments, selecting the WebSocket connection options includes determining which one or more of the provided configuration options provided in the request received at 302 should be supported. For example, the received request includes a plurality of possible configuration options and only one of the options is to be selected by the receiver of the request. In some cases, the receiver may be able to select a plurality of options from the plurality of configuration options. In some embodiments, selecting the WebSocket connection option includes determining whether a configuration option in a received request is supported by the receiver of the request. For example, the request received at 302 includes an identifier of an extended capability of the WebSocket protocol and it is determined whether the receiver of the request supports the extended capability. In some embodiments, selecting the WebSocket connection option includes configuring a control message. For example, a control byte sequence to be utilized to signal a control message associated with a specified extended capability is determined.

At 306, a response indicating the selected WebSocket connection options and a notification that the connection has been upgraded to a WebSocket connection are sent. The response may be sent to a client by a server such as server 110, server 114 and/or WebSocket gateway 112 of FIG. 1. In some embodiments, sending the response includes sending a response to a WebSocket handshake upgrade request received in 302. In some embodiments, sending the response includes completing an opening handshake as defined in the WebSocket standard.

In some embodiments, the response includes a confirmation of support for one or more protocol capabilities that are not directly specified in the WebSocket protocol standard. For example, the response includes identifiers of one or more extended capabilities of the WebSocket protocol that are supported by a server. Not all extended capabilities requested by a client in a request may be supported. In some embodiments, the response includes a response to a request to initialize an extended capability that can be controlled using a control message. For example, the response includes confirmation that a control message for a specified extended capability not directly implemented by the WebSocket protocol standard may be utilized. In some embodiments, the response includes one or more configuration parameters associated with the control message. For example, the response includes a control byte sequence to be utilized to identify that a sent communication includes a control message associated with a specific extended capability identified by the control byte sequence.

Figure 4:
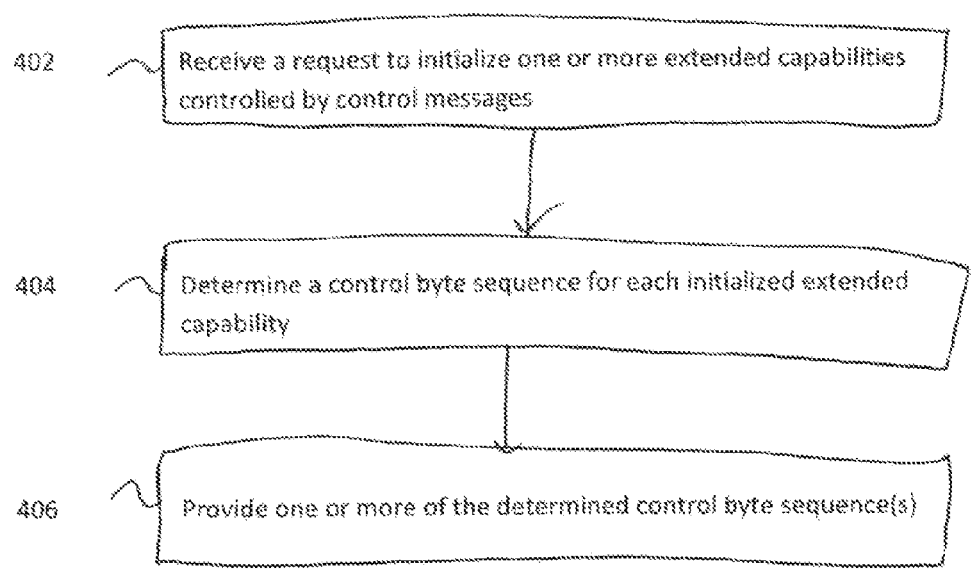
FIG. 4 is a flowchart illustrating an embodiment of a process for providing a control byte sequence.

FIG. 4 is a flowchart illustrating an embodiment of a process for providing a control byte sequence. The process of FIG. 4 may be implemented on one or more components of server 110, server 114 and/or WebSocket gateway 112. In some embodiments, at least a portion of the process of FIG. 4 is included in step 302 and/or 304 of FIG. 3. At 402, a request to initialize one or more extended capabilities controlled by control messages is received. In some embodiments, the request to initialize the extended capabilities was included in the request sent in 204 of FIG. 2. In some embodiments, the request to initialize the controlled extended capabilities was included in the request received in 302 of FIG. 3. In some embodiments, the request to initialize the controlled extended capabilities is received as a request outside of the WebSocket upgrade handshake process. For example, the request is received after a WebSocket connection has been already established. In some embodiments, the request includes an identification of one or more capabilities that are not directly specified in the WebSocket protocol standard. For example, the request includes an identifier of an extended capability of the WebSocket protocol that is supported by a client sending the request. In some embodiments, the request includes a request to initialize the utilization of one or more control messages regarding one or more specified extended capabilities not directly implemented by the WebSocket protocol standard. In some embodiments, the request includes one or more configuration parameters associated with the control messages.

At 404, a control byte sequence is selected for each initialized extended capability. In some embodiments, the request received at 402 includes an identifier for each identified extended capability. For each of these identifiers, it is determined whether the associated extended capability is supported. For example, if the extended capability is supported, a control byte sequence for the extended capability is determined. In some embodiments, selecting a control byte sequence includes selecting a unique identifier that can be used by a WebSocket communication sender to identify that a control message for a specified extended capability is included in a WebSocket frame. For example, the control byte sequence may be included in a payload data portion of a WebSocket frame to identify that contents of the frame include a control message (e.g., a message specifying that updated authentication credentials should be sent to a location address specified in the message) that is to be processed in a different manner as compared to a normal WebSocket frame (e.g., containing end application level data) that does not include the control message. The control byte sequence may be specifically assigned to a specific extended capability. For example, a different control byte sequence exists for each different extended capability that is supported. In some embodiments, an extended capability may be selectively controlled using the control byte sequence. For example, a specified extended capability may be configured by sending a WebSocket frame that includes the control byte sequence and a control message. In another example, a specified extended capability may be selectively activated and deactivated at least in part by sending a WebSocket frame that includes the control byte sequence and a control message.

In some embodiments, the control byte sequence is a predetermined length. For example, all control byte sequences contain the same number of bits (e.g., 4 bytes) to enable efficient identification of a control byte sequence within a WebSocket frame. In some embodiments, determining the control byte sequence includes selecting a binary number. The control byte sequence may be at least in part randomly determined, selected from a list of possible options, sequentially selected, and/or dynamically generated. In other embodiments, the control byte sequence may be predetermined. In other embodiments, the control byte sequences are not necessarily the same length.

In some embodiments, the control byte sequence is determined such that the bits of control byte sequence contain the maximum number of overlapping bits (e.g., maximum number of binary bits that are the same) with the bits of one or more other control byte sequences. For example, if all of the different control byte sequences contain the maximum number of same overlapping bits, an efficient determination of whether a WebSocket frame includes any type of control byte sequence may be made by determining whether the WebSocket frame includes the bits of the overlapping bits. If the WebSocket frame does not include the bits of the overlapping bits (e.g., in the beginning of the payload data portion of the WebSocket frame), a determination may be made that the WebSocket frame does not include any control byte sequence from a group of possible control byte sequences without making a separate determination for each control byte sequence from the group. If the WebSocket frame does include the bits of the overlapping bits (e.g., in the beginning of the payload data portion of the WebSocket frame), additional processing may be performed to determine which control byte sequence, if any, from a group of possible control byte sequences is included in the WebSocket frame. An example of selecting bits of a control byte sequence that contain the maximum number of overlapping bits with the bits of one or more other control byte sequences includes selecting as the control byte sequence an available binary number representation that is sequentially adjacent to a binary number representation of one of the preexisting control byte sequences.

In some embodiments, the control byte sequence is selected based at least in part on a protocol and/or an encoding scheme associated with a WebSocket connection. In some embodiments, a control byte sequence is selected such that the control byte sequence is unlikely to occur in a normal communication utilizing the protocol and/or the encoding scheme because the control byte sequence violates a specification of the protocol and/or encoding scheme. For example, a communication of a WebSocket connection may be utilizing a UTF-8 encoding scheme (i.e., a variable length encoding scheme used to represent characters). In the UTF-8 specification, representing a character using 21 bits requires the bits to be encoded into 4 bytes. The 4 bytes are "11110xxx," "10xxxxxx," "10xxxxxx," and "10xxxxxx" where "x" represents a place where each bit of the 21 bits can be placed. When the first byte (i.e., "11110xxx") is received by a receiver, the receiver expects the subsequent 3 bytes to begin with "10" in a correct UTF-8 encoding. However, by selecting a 4 byte control byte sequence that begins with "11110xxx" but where subsequent bytes of the sequence do not all begin with "10," the selected control byte sequence cannot occur in a valid UTF-8 encoded WebSocket communication. By minimizing the likelihood that the control byte sequence is likely to occur in normal WebSocket communication, processing required to handle situations when non-control data sent in a WebSocket frame happens to include a control byte sequence (potentially causing the WebSocket frame to be incorrectly interpreted as including a control message) may be minimized.

At 406, the one or more determined control byte sequences are provided. In some embodiments, step 406 is included in step 306 of FIG. 3. In some embodiments, the provided control byte sequence is received in step 206 of FIG. 2. For example, a control byte sequence is provided together with a response indicating a successful upgrade of a connection to a WebSocket connection. One or more of the control byte sequences may be provided as a hexadecimal number. For example, an identifier of an extended capability that will be supported by an established WebSocket connection is provided with an associated hexadecimal control byte sequence that can be used to send a control message associated with the extended capability.

Figure 5:
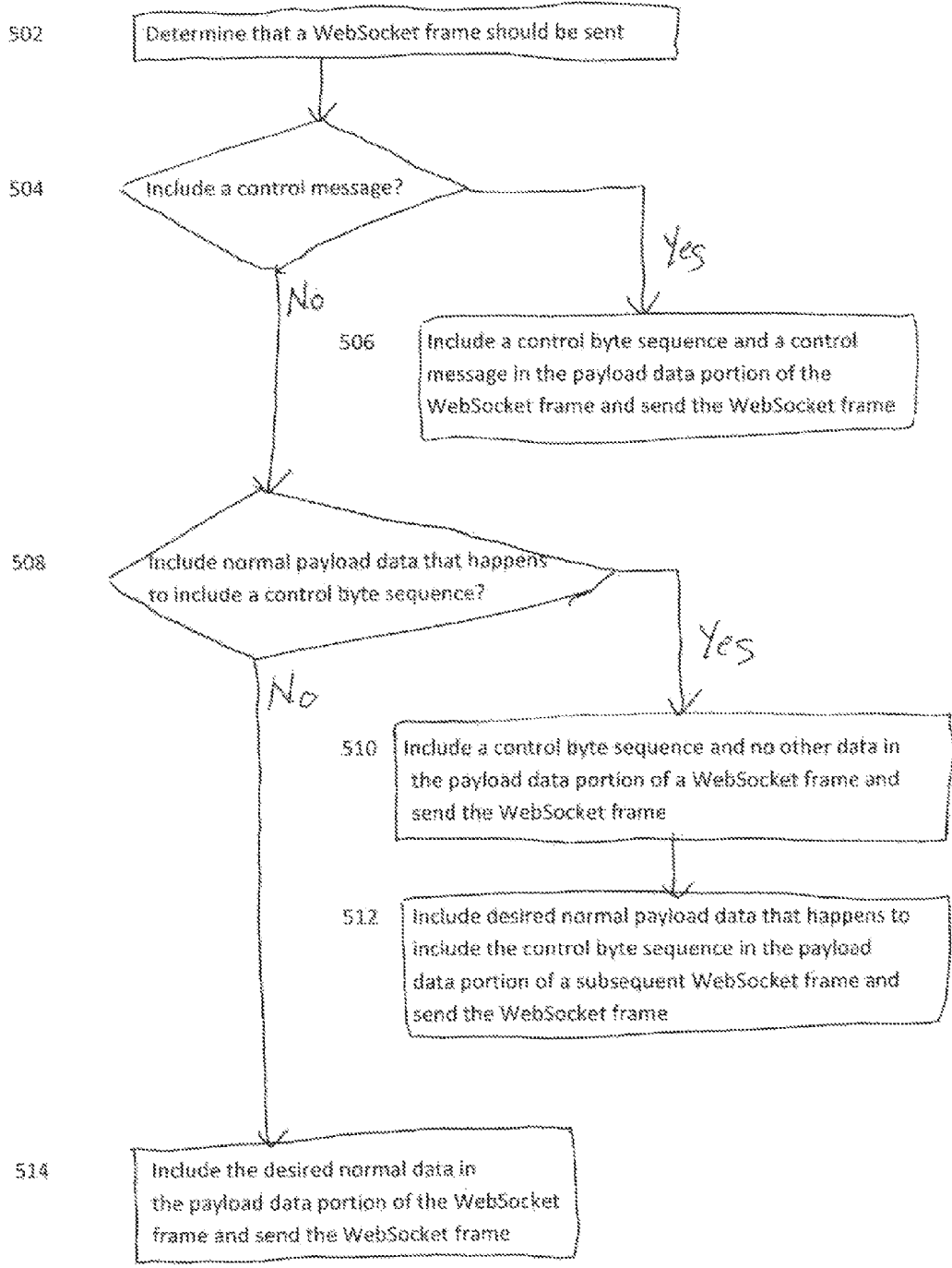
FIG. 5 is a flow chart illustrating an embodiment of a process for sending a WebSocket frame.

FIG. 5 is a flow chart illustrating an embodiment of a process for sending a WebSocket frame. The process of FIG. 5 may be implemented on client 102, server 110, server 114 and/or WebSocket gateway 112 of FIG. 1.

At 502, it is determined that a WebSocket frame should be sent. Determining that a WebSocket frame should be sent may be associated with preparing a WebSocket frame to be sent. If at 504 it is determined that the WebSocket frame to be sent should include a control message, at 506, a control byte sequence and a control message are included in the payload data portion of the WebSocket frame and the frame is sent. The frame may be included in a group of frames before being sent. The control byte sequence is associated with the extended functionality to be controlled using the control message. In some embodiments, the control byte sequence is a control byte sequence determined at step 404 of FIG. 4. In some embodiments, the control byte sequence, if present in a WebSocket frame, may be required to be placed within the same relative position within a payload portion of a WebSocket frame. For example, a control byte sequence, if present, is always placed in the beginning of the payload data portion of a WebSocket frame. The control message may include data that specifies a configuration parameter, metadata, and/or a data to be processed by the identified extended functionality. In some embodiments, the control message is managed, created, and/or processed at a processing level distinct from a processing level of an end destination application. For example, the control message is processed by a web browser distinct from the processing level of a web application executing within the web browser. In this example, although normal payload contents of a WebSocket frame are forwarded to the web application, the web application is unaware of control messages in the payload of a WebSocket frame.

In some embodiments, if a WebSocket frame includes a control message, the WebSocket frame is required to include one or more specific data in a metadata portion (e.g., an opcode portion) of the WebSocket frame. For example, according to the WebSocket standard, all WebSocket frames must include a 4 bit opcode that specifies how to interpret the payload portion of the WebSocket frame. In some embodiments, if a WebSocket frame includes a control message, the WebSocket frame is required to include an opcode for a "binary frame" (i.e., hex "% x2"). In this case, a receiver of a WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on that WebSocket frame.

If at 504 it is determined the WebSocket frame to be sent should not include a control message, at 508 it is determined whether normal payload data that happens to include a control byte sequence is being sent. In some embodiments, the normal payload data does not include a control message. For example, the normal payload data is intended for an end destination application such as web application 106 of FIG. 1. In some embodiments, although bandwidth efficiency is gained by not dedicating a fixed portion of the WebSocket frame to a control byte sequence, there exists a need to address situations when normal non-control data is being sent in the payload data portion of a WebSocket frame but the data desired to be sent happens to include a control byte sequence that might cause the WebSocket frame to be incorrectly interpreted as including a control message. If the normal payload data to be sent happens to include a control byte sequence, at 510, a WebSocket frame that only includes in its payload data portion the control byte sequence and no other data is sent. This WebSocket frame signals that the subsequent WebSocket frame that includes the control byte sequence should not be interpreted as containing a control message. Then at 512, the desired non-control data that happens to include the control byte sequence is included in the payload data portion of a subsequent WebSocket frame and the WebSocket frame is sent. This WebSocket frame would be interpreted as not including a control message.

If at 508 it is determined that normal payload data to be sent in the WebSocket frame does not happen to include a control byte sequence, at 514, the desired normal payload data is included in the payload data portion of the WebSocket frame and the WebSocket frame is sent. For example, because no special processing is necessary with respect to the interpretation of the payload data of the WebSocket frame, the WebSocket frame may be created and sent normally as defined in the WebSocket standard. In some embodiments, the WebSocket frame may be included in a grouping of WebSocket frames before being sent.

Figure 6:
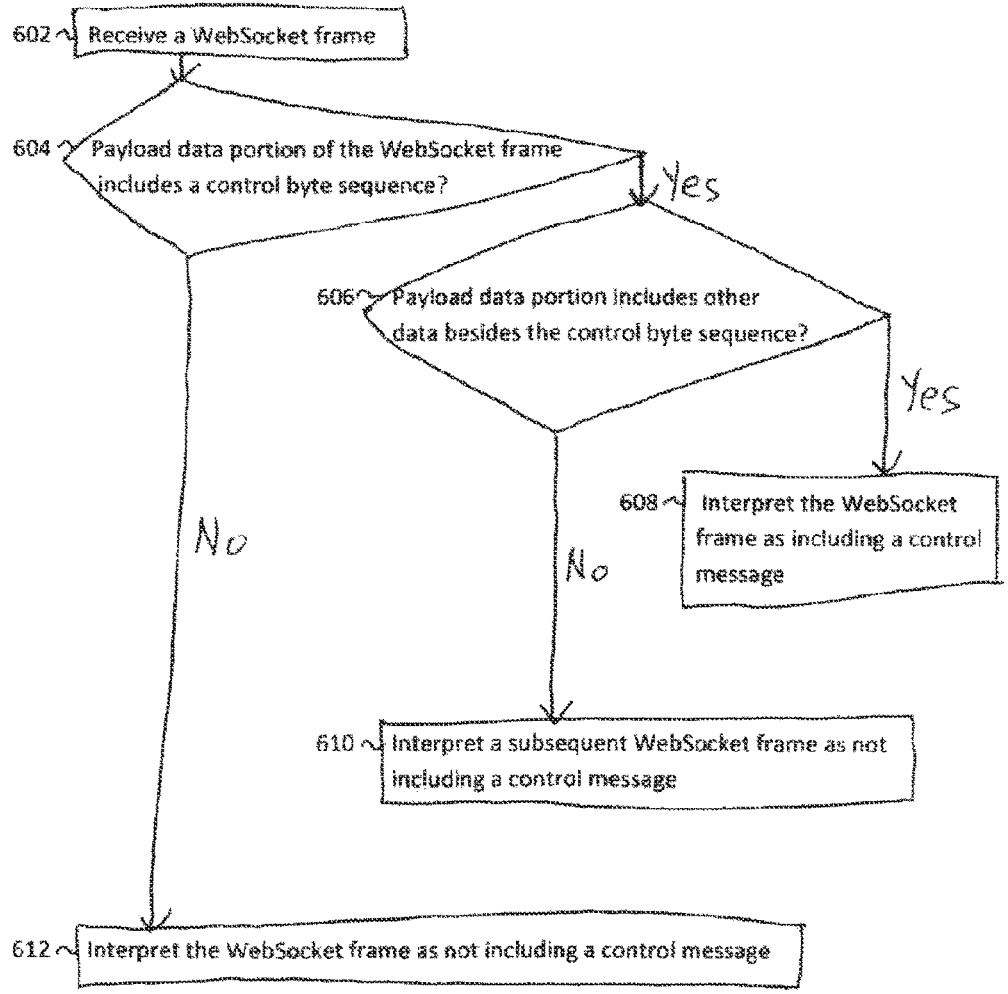
FIG. 6 is a flowchart illustrating an embodiment of a process for receiving a WebSocket frame.

FIG. 6 is a flowchart illustrating an embodiment of a process for receiving a WebSocket frame. The process of FIG. 6 may be implemented on client 102, server 110, server 114 and/or WebSocket gateway 112 of FIG. 1. At 602, a WebSocket frame is received. In some embodiments, the received frame includes the WebSocket frame sent at least in part by using the process of FIG. 5. In some embodiments, the received WebSocket frame may be one frame of a group of WebSocket frames received together.

At 604 it is determined whether the payload data portion of the received WebSocket frame includes a control byte sequence. In some embodiments, the control byte sequence is a control byte sequence determined at 404 of FIG. 4. The control byte sequence, if present in a WebSocket frame, may be required to be placed within the same relative position as a payload portion of a WebSocket frame. For example, a control byte sequence, if present, is always placed in the beginning of the payload data portion of a WebSocket frame. If at 604 it is determined that the payload data portion of the received WebSocket frame includes a control byte sequence, at 606 it is determined whether the payload data portion also includes other data besides the control byte sequence. If the payload data does include other data, at 608, the received WebSocket frame is interpreted as including a control message. In some embodiments, interpreting the WebSocket frame as including a control message includes determining which extended functionality is associated with the control byte sequence and interpreting the control message based on the determined extended functionality.

In some embodiments, interpreting the WebSocket frame as a control message includes processing the control message included in the payload data portion of the WebSocket frame. This data may specify a configuration parameter, metadata, and/or a data to be otherwise processed. In some embodiments, the control message is managed, created, and/or processed at a processing level distinct from an end destination application. For example, the control message is managed by a web browser distinct from the processing level of a web application executing within the web browser. In this example, although normal payload contents of a WebSocket frame are forwarded to the web application, the web application is unaware of the control message and is provided the control message. In some embodiments, the WebSocket frame interpreted at 608 was sent in step 506 of FIG. 5.

If at 606 it is determined that the payload data portion does not include other data besides the control byte sequence, at 610, it is determined to interpret the next received WebSocket frame that includes the control byte sequence as not including a control message. For example, payload data contents of a subsequently received WebSocket frame are forwarded to a destination application such as web application 106 of FIG. 1. In some embodiments, the WebSocket frame that only includes the control byte sequence in its payload was sent in step 510 of FIG. 5 and the subsequent WebSocket frame to be interpreted as not a control message is sent in step 512 of FIG. 5.

If at 604 it is determined that the payload portion of the received WebSocket frame does not include the control byte sequence, at 612, the WebSocket frame is interpreted as not including a control message. For example, because no special processing is necessary with respect to the interpretation of the payload data of the WebSocket frame, the WebSocket frame may be processed normally as defined in the WebSocket standard. In some embodiments, payload contents of the WebSocket frame are forwarded to a destination application such as web application 106 of FIG. 1 because the WebSocket frame does not include a control byte sequence. In some embodiments, the WebSocket frame interpreted at 612 was sent in step 514 of FIG. 5.

In some embodiments, the process of FIG. 6 is only utilized to determine whether a received WebSocket frame includes a control message if the WebSocket frame includes one or more specific data in an opcode portion of the WebSocket frame. For example, according to the WebSocket standard, all WebSocket frames include a 4 bit opcode that specifies how to interpret the payload portion of the WebSocket frame. In some embodiments, if a WebSocket frame includes a control message, the WebSocket frame is required to include an opcode for a "binary frame" (i.e., hex "% x2"). In this case, a receiver of the received WebSocket frame may make a quick determination on whether the received WebSocket frame potentially includes a control message by analyzing the opcode of the WebSocket frame. If the WebSocket frame does not contain a specific opcode (e.g., opcode for "binary frame"), it can be quickly determined that further processing required to determine and process a control message does not need to be performed on the WebSocket frame and, as in the case of step 612, the WebSocket frame is interpreted as not including a control message.

Figure 7:
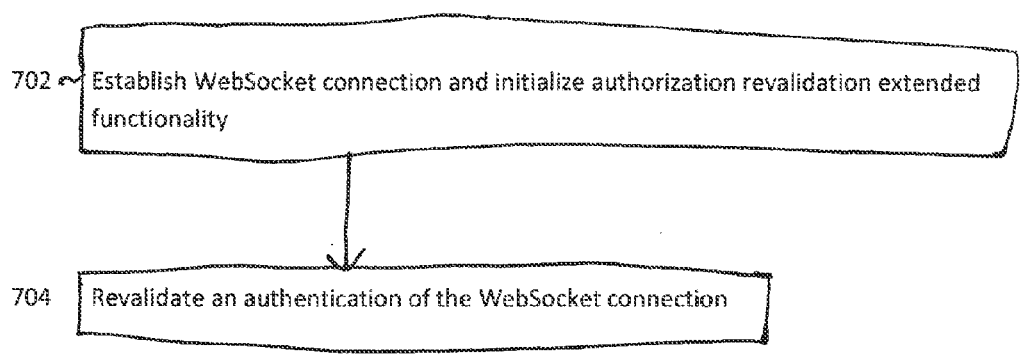
FIG. 7 is a flowchart illustrating an embodiment of a process for revalidating an authentication of a WebSocket connection.

FIG. 7 is a flowchart illustrating an embodiment of a process for revalidating an authentication of a WebSocket connection. The process of FIG. 7 may be implemented on client 102, server 110, server 114 and/or WebSocket gateway 112 of FIG. 1.

At 702, a WebSocket connection is established and authorization revalidation extended functionality is initialized. In some embodiments, establishing the WebSocket connection includes performing at least a portion of the process of FIG. 2 and/or FIG. 3. In some embodiments, the extended functionality extends the WebSocket protocol to enable a communication party of a WebSocket connection to indicate to another communication party a request to provide an updated authorization. In some embodiments, initializing the extended functionality includes initializing a WebSocket protocol extension during a WebSocket handshake process and initializing a control byte sequence associated with the WebSocket protocol extension. For example, the process of FIG. 4 is performed to initialize an authorization revalidation WebSocket protocol extension controlled by a control message. In some embodiments, establishing the WebSocket connection includes communicating an initial authorization to communicate with a communication party of the WebSocket connection and/or access data/service of the communication party. For example, a token, an HTTP cookie, a key, a certificate and/or other authentication/identification/access control data is sent to provide the initial authorization. This initial authorization may expire and/or may be able to be revoked.

At 704, an authentication of the WebSocket connection is revalidated. In some embodiments, the authentication includes the initial authentication communicated in 702. In some embodiments, the authentication allows access to data and/or services for an authorized period of time and revalidating the authentication includes requesting before the authorized period of time expires and/or a WebSocket connection is to be disconnected, data that can be used to extend the authorized period of time. The request may be communicated using a WebSocket extension initialized at 702. In some embodiments, the data that can be used to extend the authorized period of time is received via a communication connection that is different that the established WebSocket connection.

Figure 8:
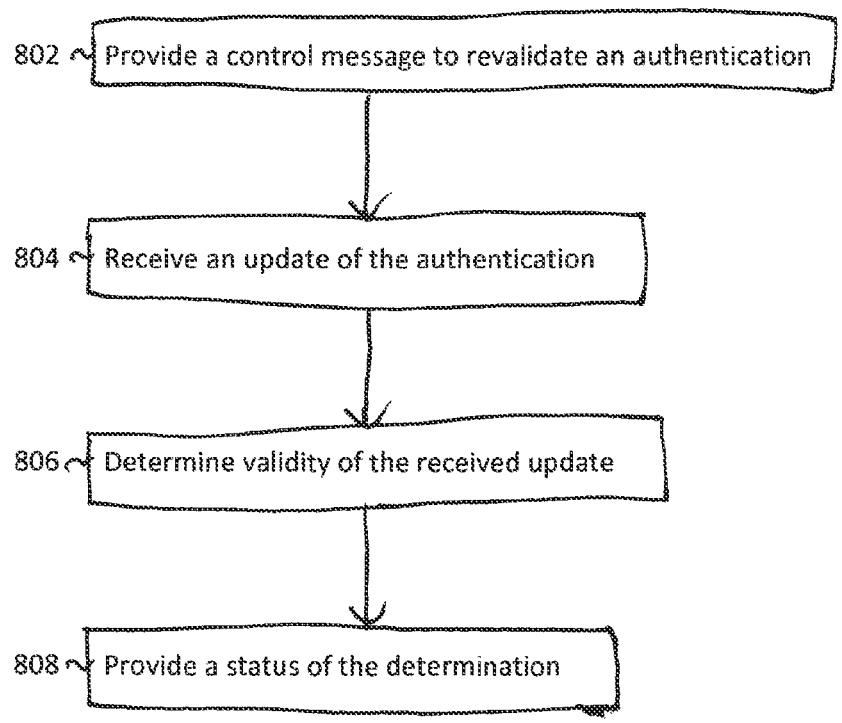
FIG. 8 is a flowchart illustrating an embodiment of a process for receiving an update of an authentication.

FIG. 8 is a flowchart illustrating an embodiment of a process for receiving an update of an authentication. The process of FIG. 8 may be implemented on client 102, server 110, server 114 and/or WebSocket gateway 112 of FIG. 1. In some embodiments, at least a portion of the process of FIG. 8 is included in 704 of FIG. 7.

At 802, a control message to revalidate an authentication is provided. In some embodiments, the control message is provided periodically, on a determined interval and/or dynamically. For example, the control message is provided at a predetermined amount of time before the authentication will become no longer valid (e.g., time expired). In another example, the control message is provided when the authentication is revoked but before the authentication becomes no longer valid (e.g., grace period after the authentication is revoked).

In some embodiments, the authentication includes an authorization to identify an identity, authentication, and/or data/service access rights of a communication party. In various embodiments, the authorization may be provided via a token, an HTTP/browser cookie, a certificate, a key and/or any other authentication/identification/access control data. The authorization may be provided by a network device such as an authorization server (e.g., server 118 of FIG. 1) and/or another client, gateway or server to a communication party seeking authorization (e.g., client 102, server 110, gateway 112 or server 114). The authorization may be limited in scope and duration. For example, the authorization may authorize a limited communication party to access a limited content/service for a limited amount of time. The authorization may be dynamically revoked (e.g., based on a policy, by a communication party, and/or by an authorization server). One or more of these limitations may be predetermined, identified in the authorization, determined by an entity granting the authorization, determined based at least in part on a security policy, requested by a communication party seeking the authorization, and/or dynamically determined based on one or more factors. For example, providing the control message includes determining that the authentication is going to expire (e.g., less than a predetermined amount of time left before expiration) and that the authentication should be revalidated to maintain communication. In some embodiments, the authorization is initially provided when a connection is established between communication parties. For example, the authorization is provided when an HTTP/HTTPS connection and/or WebSocket connection is established between communication parties. In some embodiments, the authorization is initially provided when it is desired to access a protected information/service.

In some embodiments, providing the control message includes using the control message discussed earlier in the specification. In some embodiments, an extended functionality to revalidate an authentication is initialized at least in part by utilizing the process of FIG. 4. For example, using the process of FIG. 4, communication parties of a WebSocket communication have confirmed support of the authentication revalidation extended functionality and a control byte sequence to be used to identify that a control message associated with the extended functionality is contained in a WebSocket frame. In some embodiments, the control message is provided via a WebSocket connection such as the WebSocket connection established at 702 of FIG. 7.

In some embodiments, the WebSocket communication party that has been authenticated using an authentication is notified of a request to revalidate the authentication at least in part by receiving a control message sent using at least a portion of the process of FIG. 5. For example, before an authentication of a WebSocket connection communication party is set to expire (e.g., at a determined/predetermined/dynamically determined amount before an expiration time), the communication party is notified by another communication party of the WebSocket connection at least in part by receiving a sent WebSocket frame with the control message indicating that authentication should be revalidated.

In some embodiments, the control message identifies the authentication to be revalidated. In some embodiments, the control message identifies a location where an update revalidating the authentication should be provided. For example, the update may be provided via a different communication channel than a WebSocket connection used to provide the control message and the control message identifies the destination address of the different communication channel to be used to provide the updated authentication. In some embodiments, the control message WebSocket frame that is provided may include in its payload data portion an identifier of the authentication to be revalidated and/or a location identifier (e.g., URL) of a location where an update revalidating the authentication should be provided.

At 804, an update of the authentication is received. In some embodiments, receiving the update includes receiving communication from a communication party of a WebSocket connection. In some embodiments, the update is received via a WebSocket connection (e.g., WebSocket connection established at 702 of FIG. 7) used to provide the control message at 802. In some embodiments, the update is received via a connection that is different than a WebSocket connection (e.g., WebSocket connection established at 702 of FIG. 7) used to provide the control message at 802. For example, in response to the control message sent at 802 via a WebSocket connection, a communication is received via a new HTTP connection. The new HTTP connection may be used instead of the WebSocket connection because a process providing the communication may not be able to directly access the update to be received. For example, a process of an application such as web application 106 of FIG. 1 is not able to directly access a token, an HTTP cookie, a key, a certificate and/or other authentication/identification/access control data containing the update of the authentication to be able to directly provide the update via an established WebSocket connection, and the application initiates a new connection to a destination location identified in the control message provided at 802 to expose access to the token, HTTP cookie, key, certificate and/or other authentication/identification/access control data as a part of establishing the new connection.

In some embodiments, receiving the update includes receiving a request (e.g., an HTTP/HTTPS "GET" or "POST" request). The request (e.g., "GET" or "POST" request) from a communication party that received the control message at 802 may be provided to a location identified in the control message. The identified location is associated with the authentication to be updated and/or a WebSocket connection of the authentication to be updated, and communication received at the identified location is associated with the authentication to be updated and/or the WebSocket connection. As a part of the request (e.g., HTTP/HTTPS "GET" or "POST" request) that establishes the new connection, the update including authentication credentials (e.g., an HTTP/browser cookie with an updated expiration time) is presented and/or allowed to be accessed. In various embodiments, the update includes one or more of the following identifying an updated authentication credential: a token, an HTTP cookie, a key, a certificate and/or other authentication/identification/access control data. In some embodiments, the update has been obtained by requesting an updated authentication credential to an authentication provider such as a single sign-on service (SSO) provider and/or authentication server 118 of FIG. 1 and receiving the authentication credential with an extended expiration time. In some embodiments, the update includes an authorization header including the updated authorization credential. For example, receiving the update includes receiving a request (e.g., HTTP/HTTPS "GET" or "POST" request) with an authorization header including the updated authorization credential.

At 806, validity of the received update is determined. In some embodiments, determining the validity includes verifying that the update includes data that can be used to revalidate the authentication. For example, the update may not include data required to extend the authentication of a communication party. In some embodiments, determining the validity includes verifying that a privilege/access granted by the update meets a threshold. For example, it is determined whether the update extends the validity of the authentication for at least a threshold amount of time. In some embodiments, determining the validity includes authenticating the validity of the update. For example, the update is verified with an authentication server such as authentication server 118 of FIG. 1. In another example, the update is processed (e.g., decrypted) to determine the authenticity of the update. In some embodiments, determining the validity of the received update includes validating the update using an authorization module such as authorization module 116 of FIG. 1.

At 808, a status of the determination is provided. In some embodiments, providing the status includes providing a confirmation of whether the received update successfully updated (e.g., extended) the validity of the authentication. In some embodiments, providing the status includes providing an indication that a valid update to the authentication was not received within an allotted amount of time and closing the WebSocket session of the authentication.

In some embodiments, in response to the HTTP/HTTPS request (e.g., "GET" or "POST" request) received at 804, a response with an HTTP status code is provided. For example, if the request did not present an authorization header with a valid authorization credential, an HTTP "401" status code is provided to request a re-authorization challenge. In response to the HTTP "401" status code, a new HTTP/HTTPS request (e.g., "GET" or "POST" request) with an authorization header including an updated authentication credential may be received. This updated authentication credential may be analyzed again to determine its validity and to provide the status of this determination. In another example, if the request did not present an authorization header with a valid authorization credential, an HTTP "403" status code is provided to indicate that the authentication was not successfully updated. Because the authentication was not successfully updated, a WebSocket connection of the authentication may be disconnected. In another example, if the request did present an authorization header with a valid authorization credential, an HTTP "200" status code is provided to indicate that the authentication was successfully updated.

Figure 9:
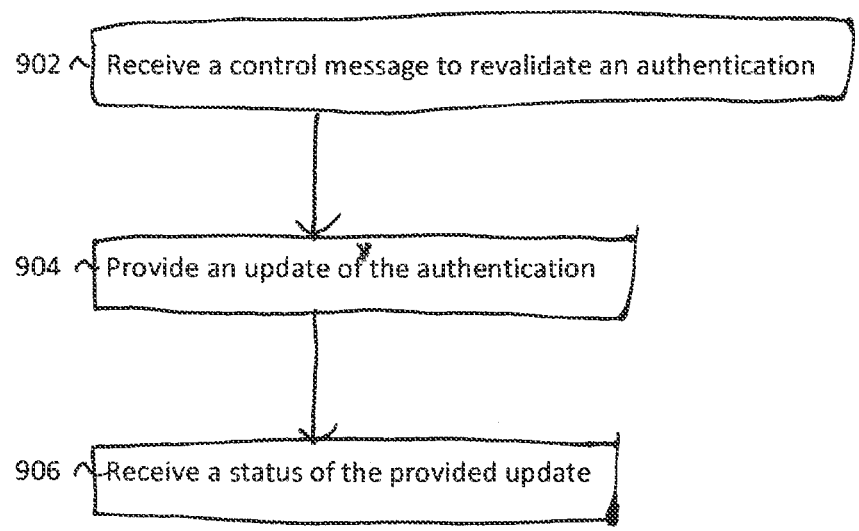
FIG. 9 is a flowchart illustrating an embodiment of a process for sending an update of an authentication.
Figure 1:
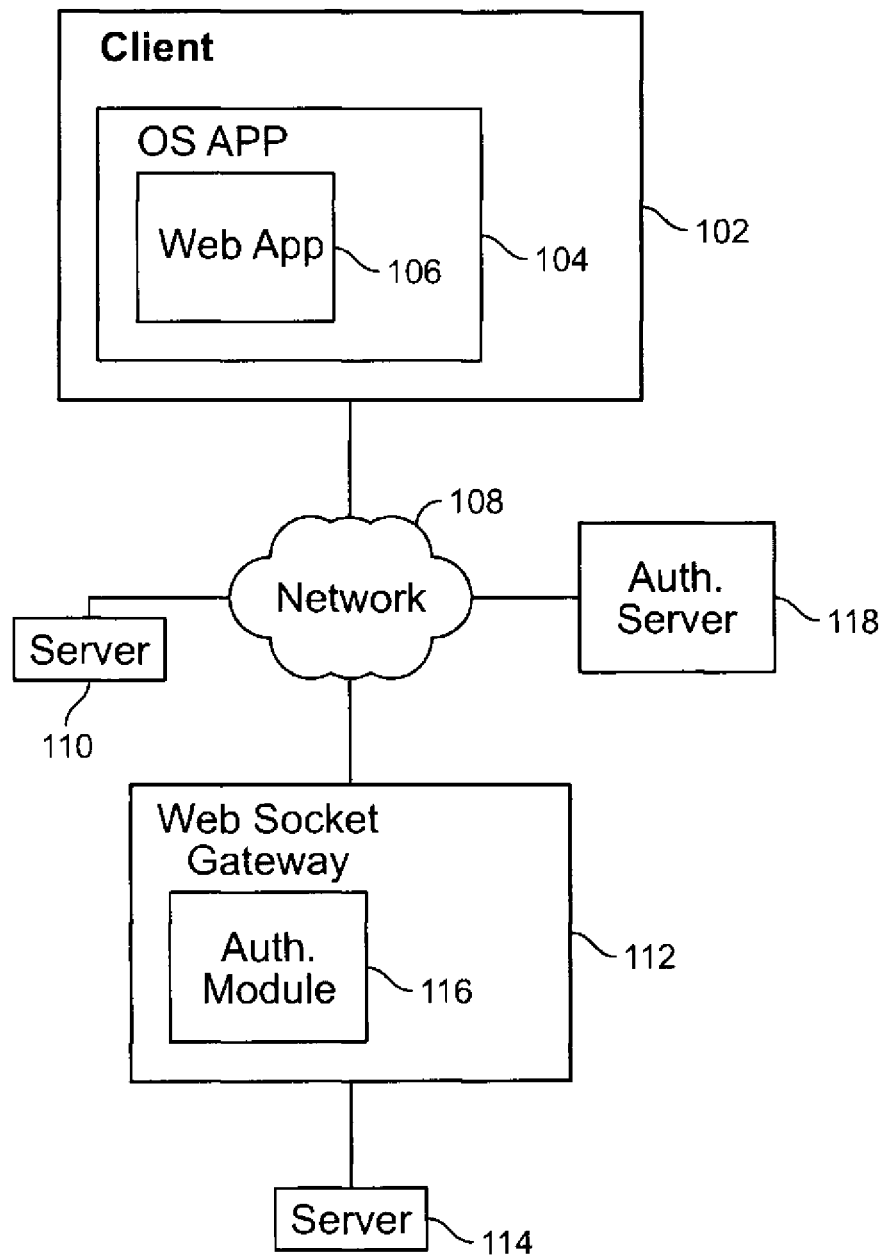
Figure 2:
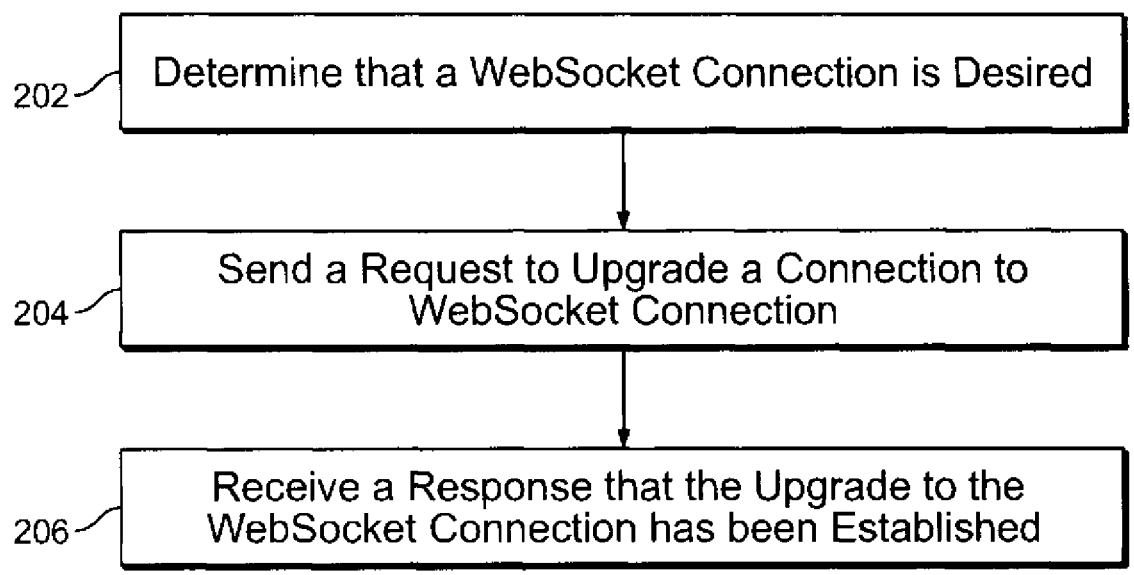
Figure 3:
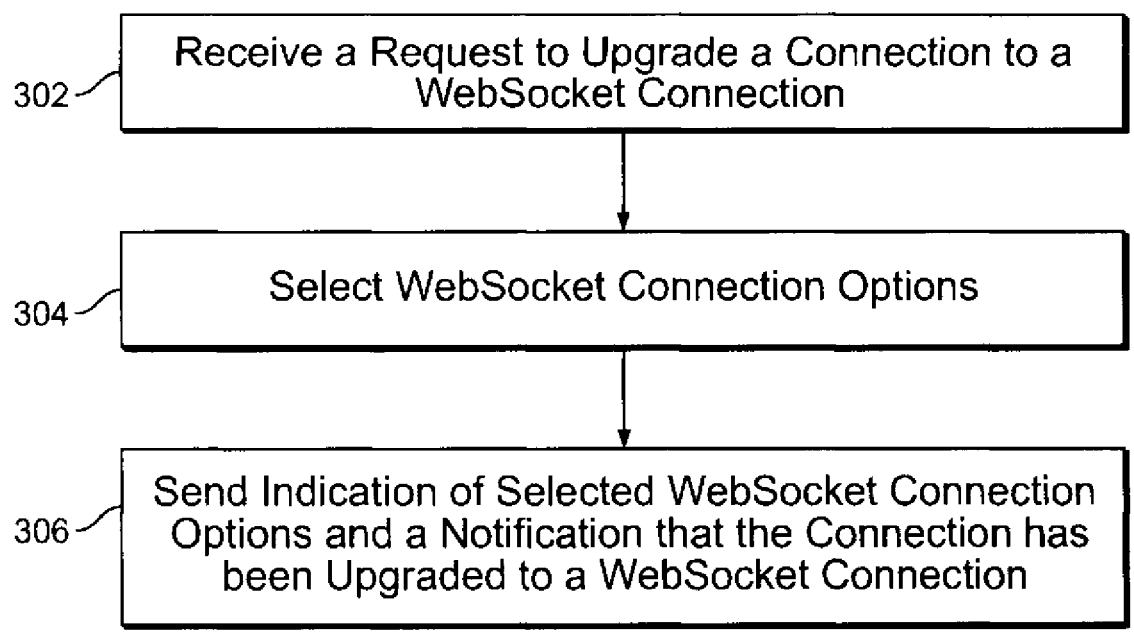
Figure 4:
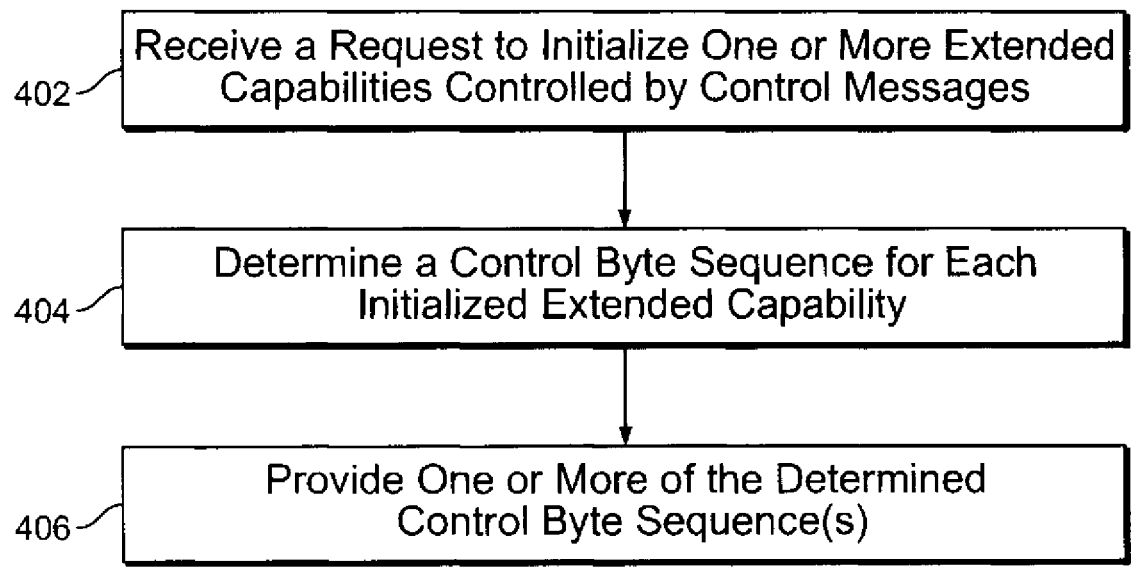
Figure 5:
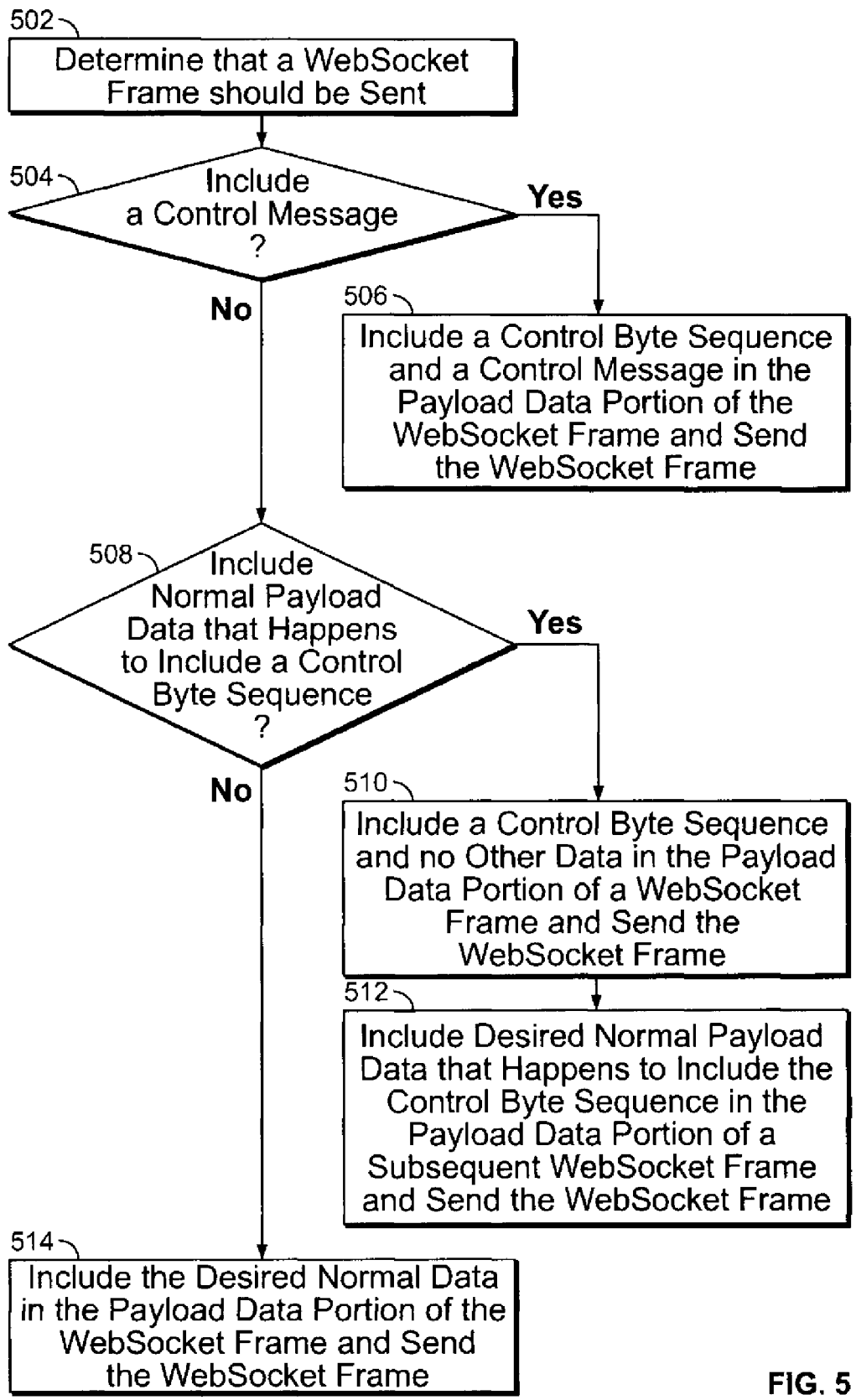
Figure 6:
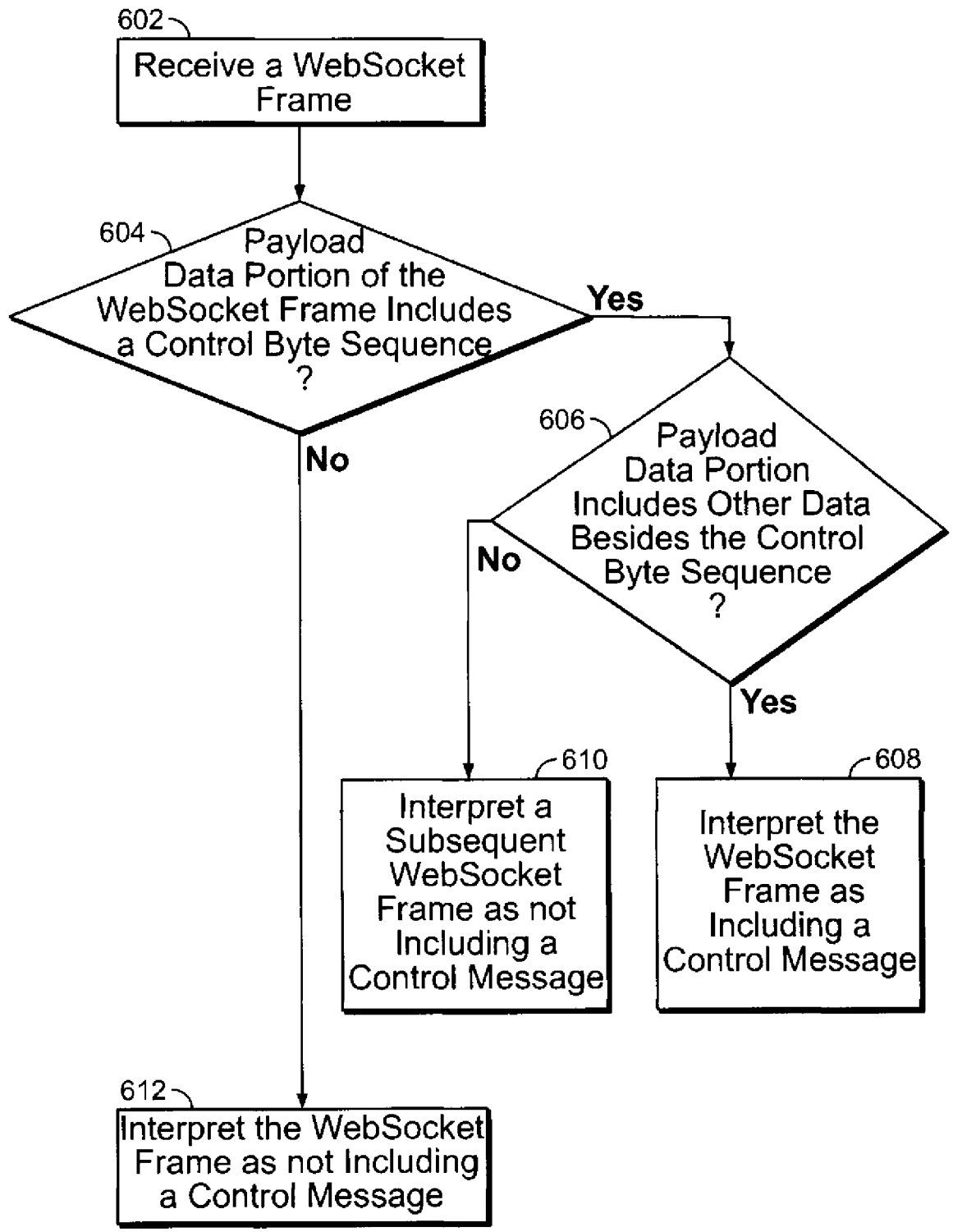
Figure 7:
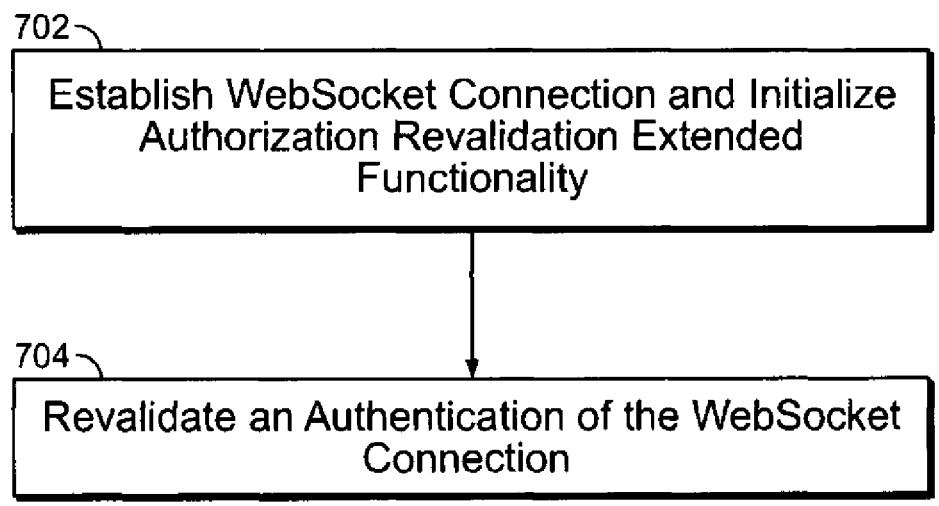
Figure 8:
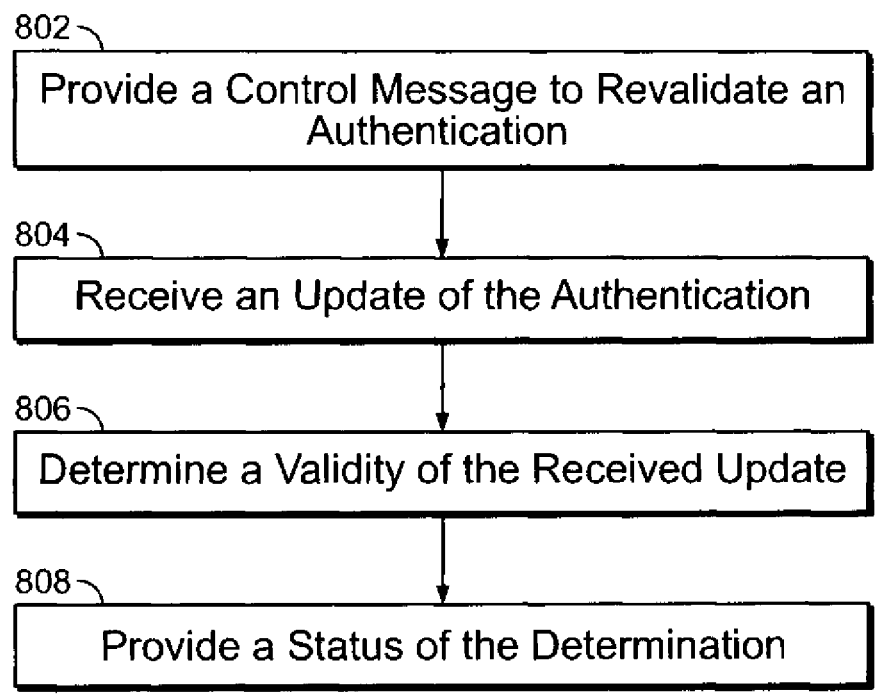
Figure 9:
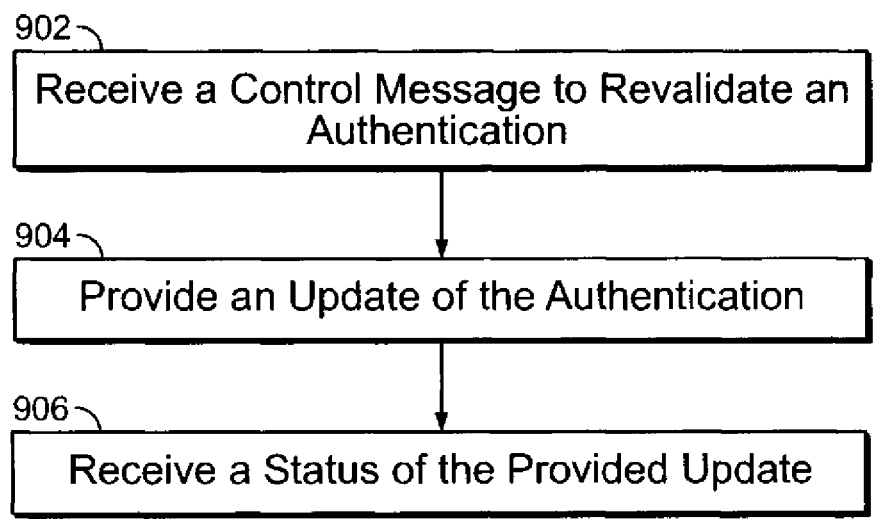
Figure 1:
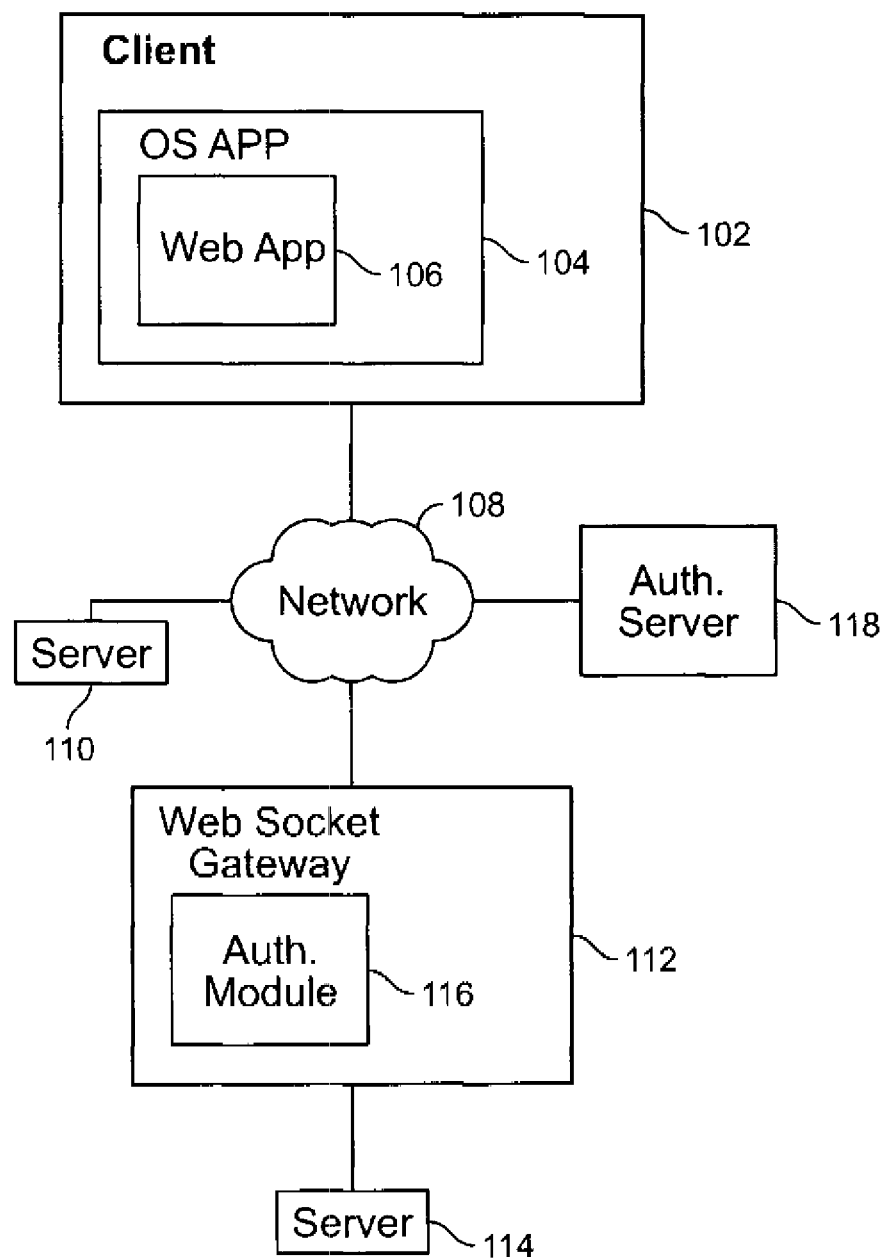
Figure 2:
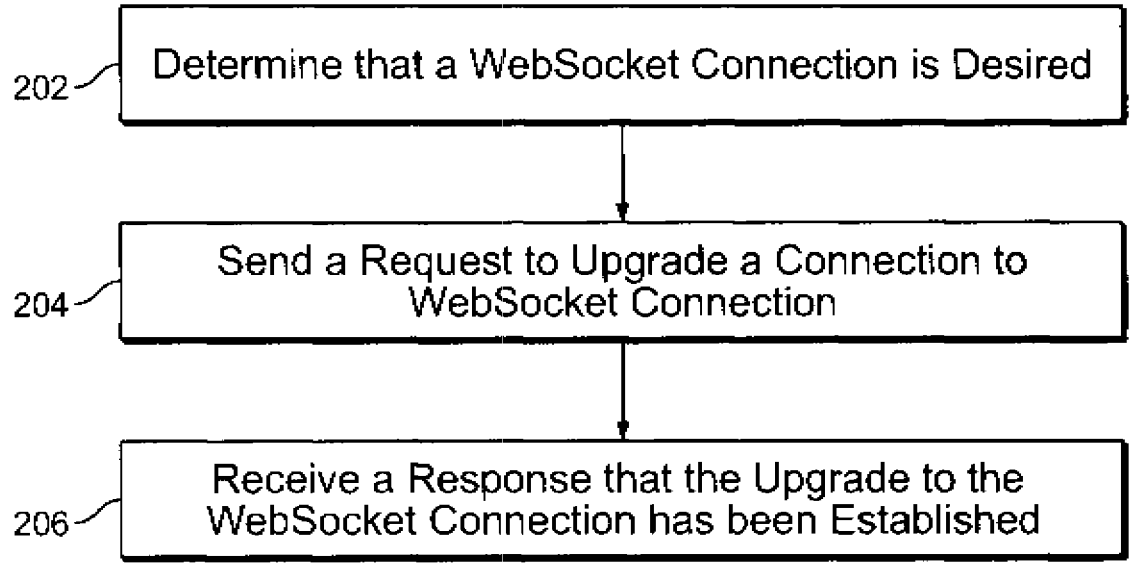
Figure 3:
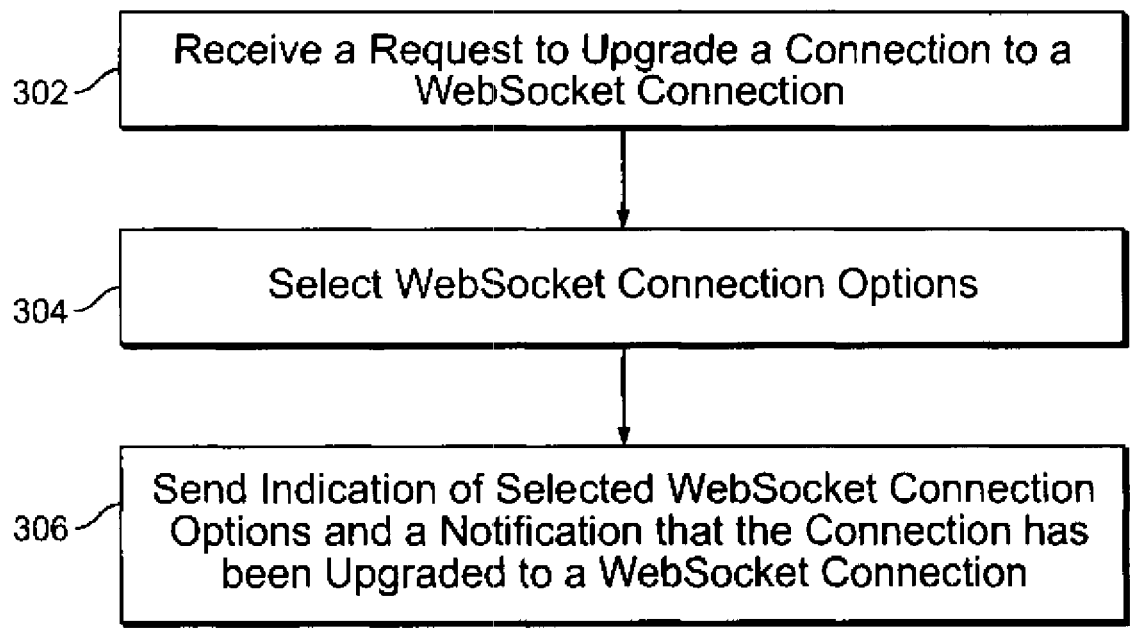
Figure 4:
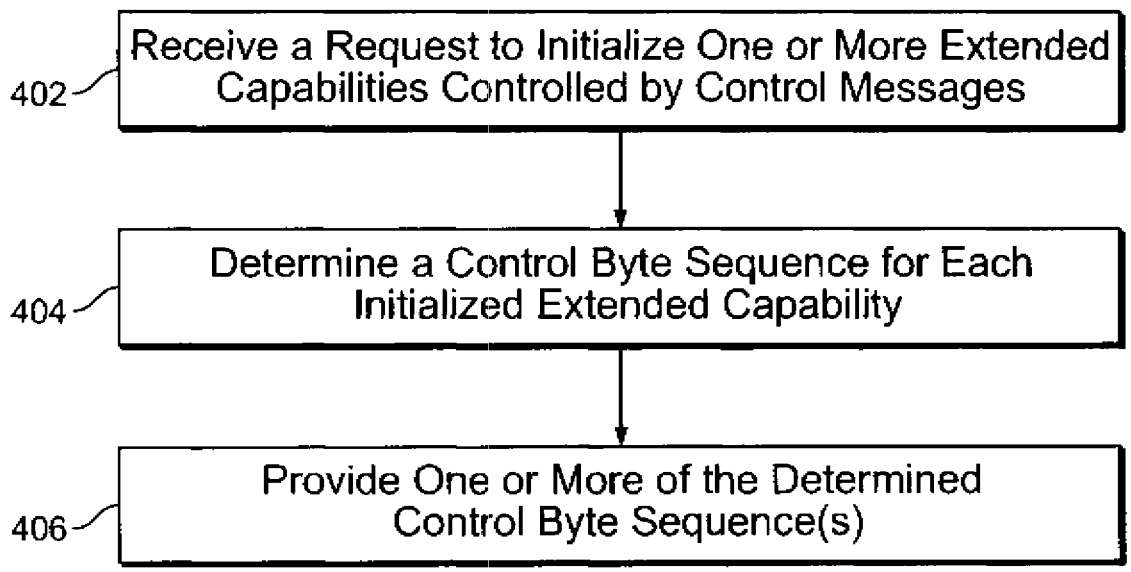
Figure 5:
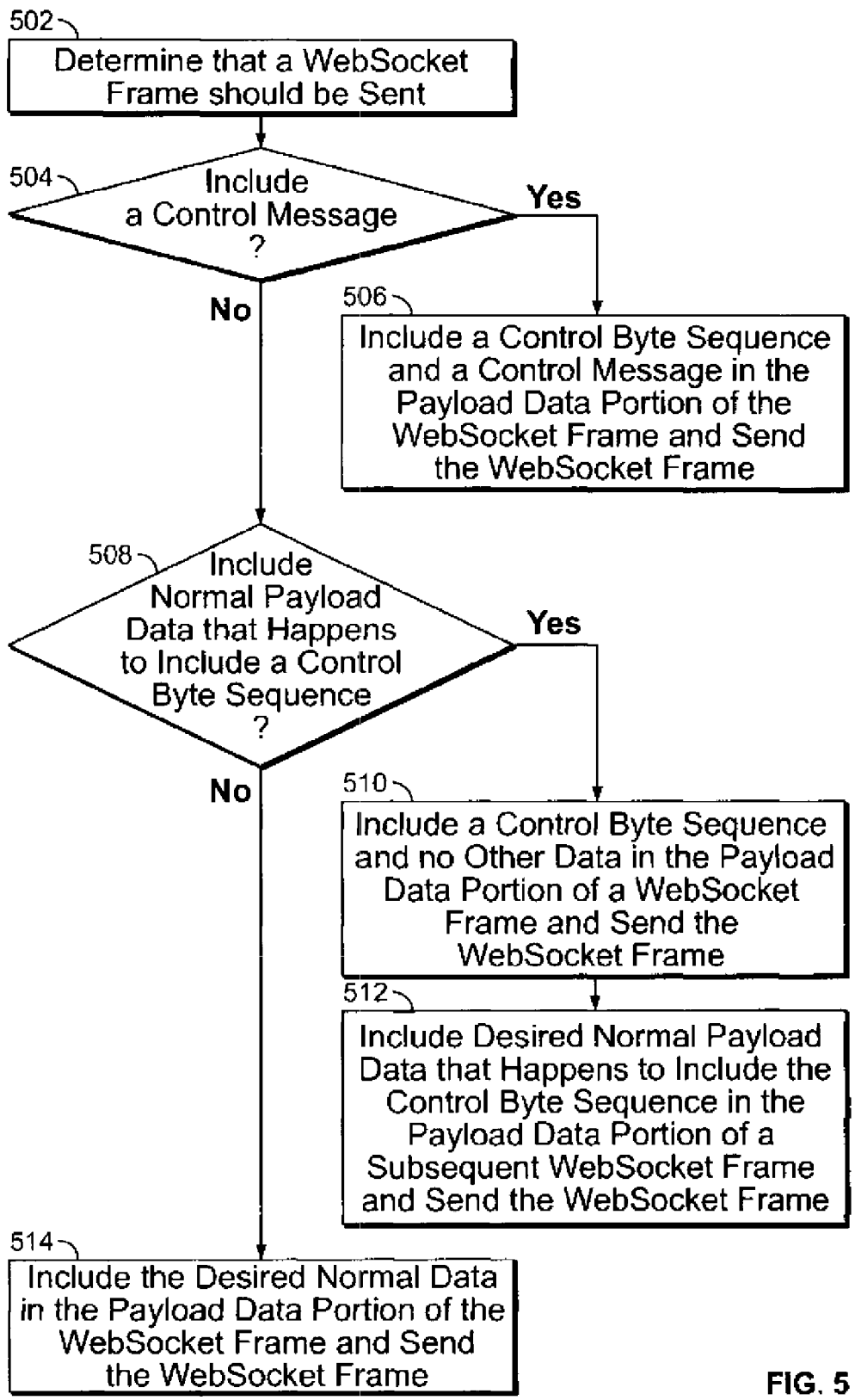
Figure 6:
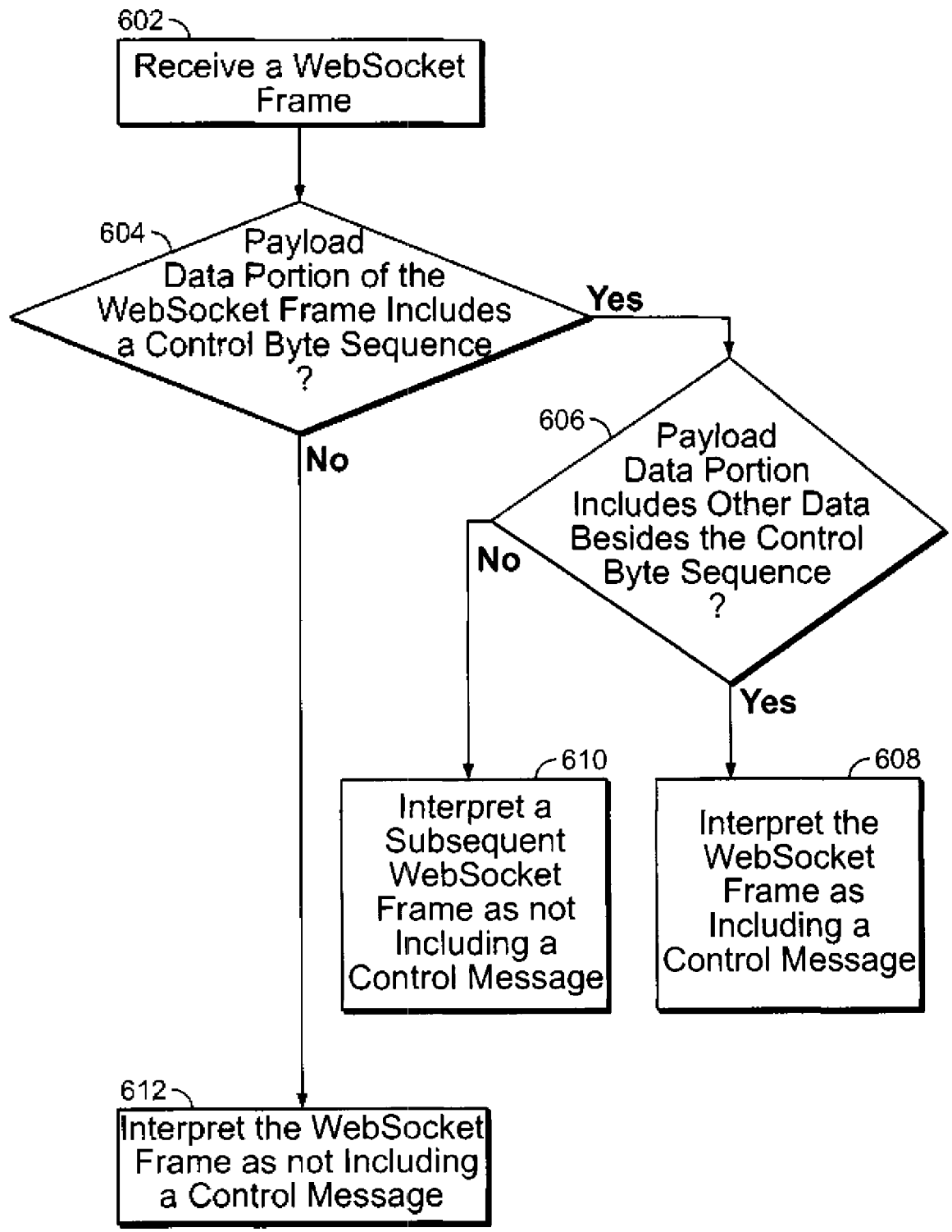
Figure 7:
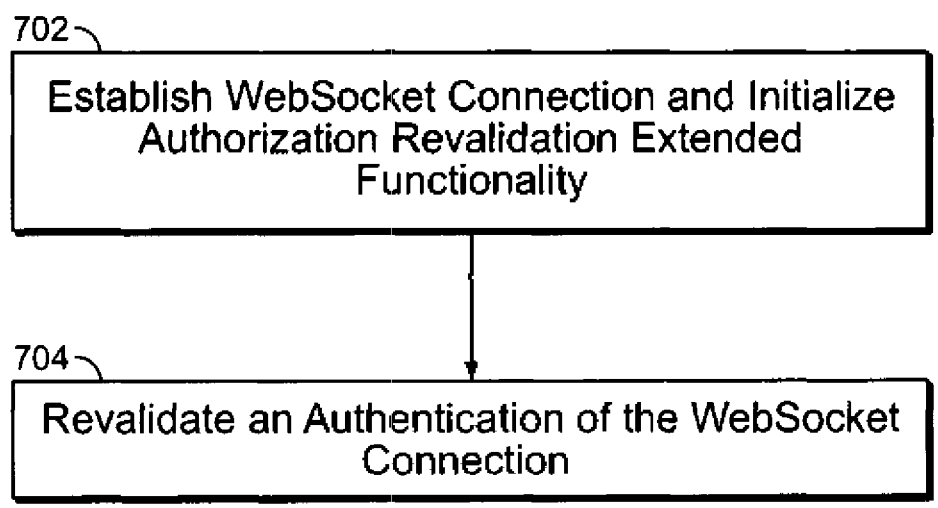
Figure 8:
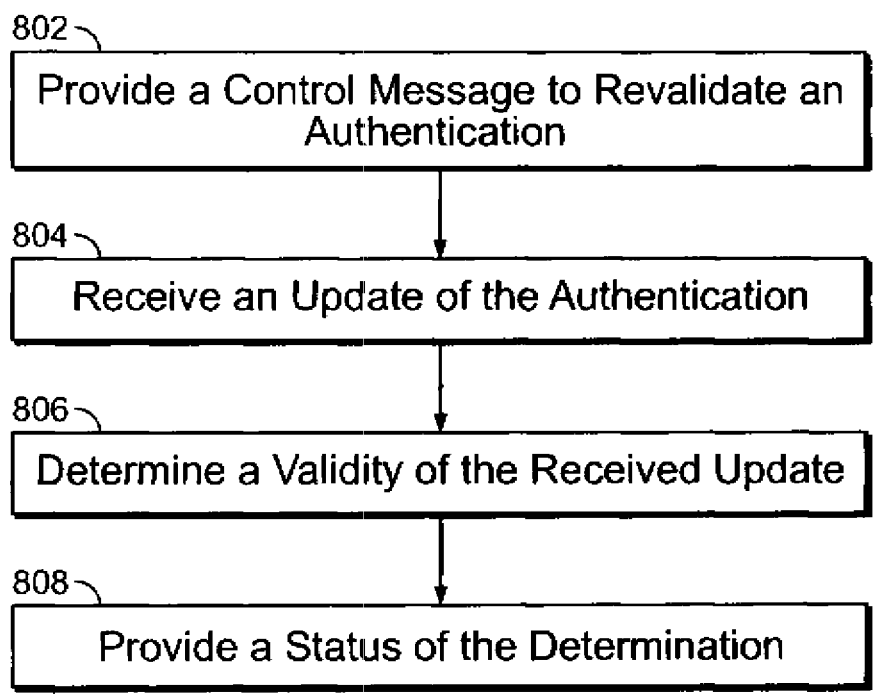
Figure 9:
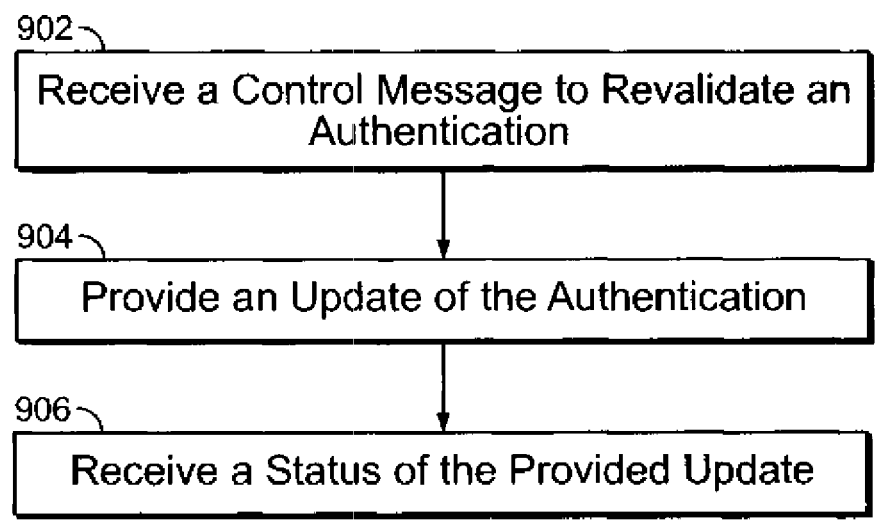

FIG. 9 is a flowchart illustrating an embodiment of a process for sending an update of an authentication. The process of FIG. 9 may be implemented on client 102, server 110, server 114 and/or WebSocket gateway 112 of FIG. 1. In some embodiments, at least a portion of the process of FIG. 9 is included in 704 of FIG. 7. In some embodiments, the process of FIG. 9 is responsive to one or more steps of the process of FIG. 8.

At 902, a control message to revalidate an authentication is received. In some embodiments, the control message is the control message sent at 802 of FIG. 8. In some embodiments, the control message is received periodically, on a determined interval, and/or dynamically. In some embodiments, the authentication was received from a network device such as an authorization server (e.g., server 118 of FIG. 1) and/or another client, gateway, or server. In some embodiments, the authorization was initially provided when a connection was established between communication parties. For example, the authorization was provided when a network connection (e.g., an HTTP/HTTPS connection and/or WebSocket connection) was established between communication parties. In some embodiments, the authorization was initially provided when the desire to access a protected information/service was initiated.

In some embodiments, receiving the control message includes receiving the control message discussed earlier in the specification. In some embodiments, an extended functionality to revalidate an authentication was initialized at least in part by utilizing the process of FIG. 4. For example, using the process of FIG. 4, communication parties of a WebSocket communication have confirmed support of the authentication revalidation extended functionality and a control byte sequence to be used to identify that a control message associated with the extended functionality is contained in a WebSocket frame. In some embodiments, the control message was received via a WebSocket connection such as the WebSocket connection established at 702 of FIG. 7.

In some embodiments, the WebSocket communication party that has been authenticated using an authentication receives the request to revalidate the authentication at least in part by receiving the control message received using at least a portion of the process of FIG. 6. For example, before an authentication of a WebSocket connection communication party is set to expire (e.g., at a determined/predetermined/ dynamically determined amount before an expiration time), the communication party is notified by another communication party of the WebSocket connection at least part by receiving a sent WebSocket frame with the control message identifying that authentication should be revalidated.

In some embodiments, the control message identifies the authentication to be revalidated. In some embodiments, the control message identifies a location where an update revalidating the authentication should be provided. For example, the update may be provided via a different communication channel than a WebSocket connection used to provide the control message and the control message identifies the destination of the different communication channel to be used to provide the updated authentication. In some embodiments, a control message WebSocket frame that is provided may include in its payload data portion an identifier of the authentication to be revalidated and/or a location identifier (e.g., URL) of a location where an update revalidating the authentication should be provided.

At 904, an update of the authentication is provided. In some embodiments, the provided update is received at 804 of FIG. 8. In some embodiments, providing the update includes providing communication to a communication party of a WebSocket connection. In some embodiments, the update is provided via a WebSocket connection (e.g., WebSocket connection established at 702 of FIG. 7) used to receive the control message at 902. In some embodiments, the update is provided via a connection that is different than a WebSocket connection (e.g., WebSocket connection established at 702 of FIG. 7) used to receive the control message at 902. For example, in response to the control message received at 902 via a WebSocket connection, a communication is sent via a new HTTP connection. The new HTTP connection may be used instead of the WebSocket connection because a process providing the communication may not be able to directly access the update to be received. For example, a process of an application such as web application 106 of FIG. 1 is not able to directly access an HTTP/browser cookie containing the update of the authentication to be able to directly provide the update via an established WebSocket connection, and the application initiates a new connection to a destination location identified in the control message provided at 802 to allow access to the HTTP/browser cookie as a part of establishing the new connection.

In some embodiments, providing the update includes providing a request (e.g., HTTP/HTTPS "GET" or "POST" request). The request (e.g., "GET" or "POST" request) may be provided to a location identified in the control message received at 902. The identified location is associated with the authentication to be updated and/or a WebSocket connection of the authentication to be updated, and communication provided at the identified location is associated with the authentication to be updated and/or the WebSocket connection. As a part of the request (e.g., HTTP/HTTPS "GET" or "POST" request) that establishes the new connection, the update including authentication credentials (e.g., an HTTP/browser cookie with an updated expiration time) is presented and/or allowed to be accessed. In various embodiments, the update includes one or more of the following identifying an updated authentication credential: a token, an HTTP cookie, a key, a certificate and/or other authentication/identification/access control data. In some embodiments, the update to be provided has been obtained by requesting an updated authentication credential to an authentication provider such as a single sign-on service (SSO) provider and/or authentication server 118 of FIG. 1 and receiving the authentication credential with an extended expiration time. In some embodiments, the update includes an authorization header including the updated authorization credential. For example, providing the update includes providing an HTTP/HTTPS "GET" request with an authorization header including the updated authorization credential.

At 906, a status of the provided update is received. In some embodiments, the received status was sent at 808 of FIG. 8. In some embodiments, receiving the status includes receiving a confirmation of whether the received update successfully updated (e.g., extended) the validity of the authentication. In some embodiments, receiving the status includes receiving an indication that a valid update to the authentication was not provided within an allotted amount of time. The WebSocket session of the authentication may be terminated.

In some embodiments, in response to the HTTP/HTTPS request (e.g., "GET" or "POST" request) provided at 904, a response with an HTTP status code is received. For example, if the "GET" request did not present an authorization header with a valid authorization credential, an HTTP "401" status code is received to request a re-authorization challenge. In response to the HTTP "401" status code, a new HTTP/HTTPS "GET" request with an authorization header including an updated authentication credential may be provided. This updated authentication credential may be analyzed by the receiver to determine its validity and to a status of this determination may be received. In another example, if the "GET" request did not present an authorization header with a valid authorization credential, an HTTP "403" status code is received to indicate that the authentication was not successfully updated. Because the authentication was not successfully updated, a WebSocket connection of the authentication may be disconnected. In another example, if the "GET" request did present an authorization header with a valid authorization credential, an HTTP "200" status code is received to indicate that the authentication was successfully updated.

Although the examples above discuss upgrading an existing HTTP/HTTPS to a WebSocket connection, in some embodiments, another type of connection such as a stream of a SPDY protocol connection is requested to be upgraded to a WebSocket connection. In various embodiments, other protocol such as SPDY may be utilized with (e.g., underlying) an established WebSocket connection.

Although the examples above discuss upgrading an existing HTTP/HTTPS connection to a WebSocket connection, in some embodiments, a protocol other than the WebSocket protocol may be used. For example, another protocol that changes an HTTP/HTTPS connection to a bi-directional, full-duplex communication channel may be utilized.

Although the foregoing embodiments have been described in some detail for purposes of clarity of understanding, the invention is not limited to the details provided. There are many alternative ways of implementing the invention. The disclosed embodiments are illustrative and not restrictive.

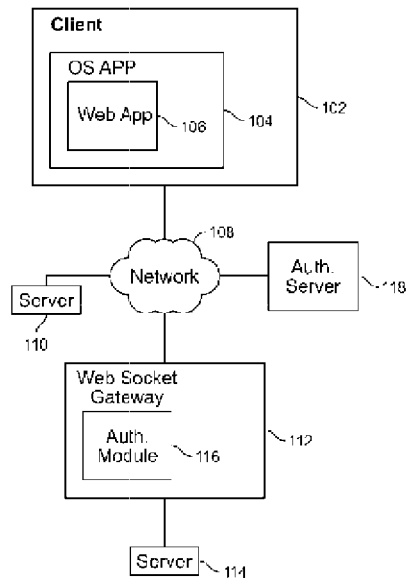

What is claimed is:

1. A system, comprising:
    a communication interface configured to:
        establish a WebSocket connection with a requester of the connection, wherein an authentication of the requester is configured to expire; and a processor coupled with the communication interface and configured to:
        provide a request to provide an update of the authentication to revalidate the authentication, wherein the request is included in a WebSocket frame, the request includes a control byte sequence that has been specifically selected for an authentication revalidation functionality and the control byte sequence indicates that the WebSocket frame is to be interpreted as a control message controlling the authentication revalidation functionality extending a WebSocket protocol of the WebSocket connection rather than a normal message of the WebSocket protocol of the WebSocket connection; and
        receive the update of the authentication without disconnecting the WebSocket connection;
        wherein a same device establishes the WebSocket connection with the requestor of the WebSocket connection, provides the request to provide the update of the authentication to revalidate the authentication, and receives the update of the authentication.

2. The system of claim 1, wherein establishing the WebSocket connection includes initializing an extension of a WebSocket protocol of the WebSocket connection at least in part by selecting the control byte sequence specifically for the authentication revalidation functionality and providing the control byte sequence to the requestor of the WebSocket connection.

3. The system of claim 1, wherein the control byte sequence is included in a payload portion of the WebSocket frame and in the event, content to be included a payload portion of a second WebSocket frame to be sent happens to include the control byte sequence but the authentication revalidation functionality is not desired for the second Websocket frame, an indication to temporarily not interpret the control byte sequence as requesting the authentication revalidation functionality is included the second WebSocket frame.

4. The system of claim 1, wherein the authentication of the requester is configured to expire at a preconfigured time.

5. The system of claim 1, wherein the authentication of the requester is configured to expire at a time associated with when the authentication is dynamically revoked.

6. The system of claim 1, wherein the authentication authorizes the requestor to access a service until the authentication expires.

7. The system of claim 1, wherein the request is provided at a predetermined amount of time before an expiration time when the authentication is configured to expire.

8. The system of claim 1, wherein the request is provided via the WebSocket connection.

9. The system of claim 1, wherein the request identifies a location address where the update should be sent.

10. The system of claim 1, wherein the update includes an authorization credential extending validity of the authorization.

11. The system of claim 1, wherein the update is provided via the WebSocket connection.

12. The system of claim 1, wherein the update is provided via a communication connection separate from the established WebSocket connection.

13. The system of claim 1, wherein the update is received via an HTTP connection.

14. The system of claim 13, wherein the update includes a cookie provided via the HTTP connection.

15. The system of claim 1, wherein the update includes an HTTP "GET" request.

16. The system of claim 1, wherein the processor is further configured to determine validity of the received update.

17. The system of claim 1, wherein the communication interface is further configured to provide a response indicating whether the authentication has been successfully revalidated using the update.

18. The system of claim 17, wherein the response includes an HTTP communication status code.

19. A method, comprising:
    using a communication interface to establish a WebSocket connection with a requester of the connection, wherein an authentication of the requester is configured to expire;
    providing a request to provide an update of the authentication to revalidate the authentication, wherein the request is included in a WebSocket frame, the request includes a control byte sequence that has been specifically selected for an authentication revalidation functionality and the control byte sequence indicates that the WebSocket frame is to be interpreted as a control message controlling the authentication revalidation functionality extending a WebSocket protocol of the WebSocket connection rather than a normal message of the WebSocket protocol of the WebSocket connection; and
    receiving the update of the authentication without disconnecting the WebSocket connection;
    wherein a same device establishes the WebSocket connection with the requestor of the WebSocket connection, provides the request to provide the update of the authentication to revalidate the authentication, and receives the update of the authentication.

20. A computer program product, the computer program product being embodied in a tangible computer readable non-transitory storage medium and comprising computer instructions for:
    establishing a WebSocket connection with a requester of the connection, wherein an authentication of the requester is configured to expire;
    providing a request to provide an update of the authentication to revalidate the authentication, wherein the request is included in a WebSocket frame, the request includes a control byte sequence that has been specifically selected for an authentication revalidation functionality and the control byte sequence indicates that the WebSocket frame is to be interpreted as a control message controlling the authentication revalidation functionality extending a WebSocket protocol of the WebSocket connection rather than a normal message of the WebSocket protocol of the WebSocket connection; and receiving the update of the authentication without disconnecting the WebSocket connection;

wherein a same device establishes the WebSocket connection with the requestor of the WebSocket connection, provides the request to provide the update of the authentication to revalidate the authentication, and receives the update of the authentication.

\* \* \* \* \*

UNITED STATES PATENT AND TRADEMARK OFFICE
CERTIFICATE OF CORRECTION

| | |
|---|---|
| PATENT NO. | : 9,154,485 B1 |
| APPLICATION NO. | : 13/837494 |
| DATED | : October 6, 2015 |
| INVENTOR(S) | : Fallows et al. |

It is certified that error appears in the above-identified patent and that said Letters Patent is hereby corrected as shown below:

Drawings

Delete drawings sheets 1-9, and substitute therefor the drawings sheets 1-9, consisting of Figures 1-9 as shown on the attached pages.

Signed and Sealed this
Twenty-ninth Day of March, 2016

Michelle K. Lee
*Director of the United States Patent and Trademark Office*

UNITED STATES PATENT AND TRADEMARK OFFICE
CERTIFICATE OF CORRECTION

PATENT NO. : 9,154,485 B1
APPLICATION NO. : 13/837494
DATED : October 6, 2015
INVENTOR(S) : Fallows et al.

It is certified that error appears in the above-identified patent and that said Letters Patent is hereby corrected as shown below:

Please substitute the Title Page with the attached Title Page.

Drawings

Delete drawings sheets 1-9, and substitute therefor the drawings sheets 1-9, consisting of Figures 1-9 as shown on the attached pages.

This certificate supersedes the Certificate of Correction issued March 29, 2016.

Signed and Sealed this
Twelfth Day of July, 2016

Michelle K. Lee
*Director of the United States Patent and Trademark Office*

United States Patent
Fallows et al.

(10) Patent No.: US 9,154,485 B1
(45) Date of Patent: Oct. 6, 2015

(54) AUTHENTICATION REVALIDATION

(71) Applicant: Kaazing Corporation, Mountain View, CA (US)

(72) Inventors: John R. Fallows, Palo Alto, CA (US); Steven R. Atkinson, Morgan Hill, CA (US)

(73) Assignee: Kaazing Corporation, San Jose, CA (US)

(*) Notice: Subject to any disclaimer, the term of this patent is extended or adjusted under 35 U.S.C. 154(b) by 34 days.

(21) Appl. No.: 13/837,494

(22) Filed: Mar. 15, 2013

(51) Int. Cl.
H04L 29/06 (2006.01)
G06F 21/31 (2013.01)

(52) U.S. Cl.
CPC .......... *H04L 63/08* (2013.01); *G06F 21/31* (2013.01); *H04L 63/108* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 6,711,136 B1 * | 3/2004 | Schneider et al. | 379/249 |
| 2008/0127323 A1 * | 5/2008 | Soin et al. | 726/12 |
| 2011/0010543 A1 * | 1/2011 | Schmidt et al. | 713/168 |
| 2012/0207088 A1 * | 8/2012 | Liu et al. | 370/328 |
| 2013/0067102 A1 * | 3/2013 | Palle et al. | 709/228 |
| 2013/0152175 A1 * | 6/2013 | Hromoko et al. | 726/5 |
| 2013/0232223 A1 | 9/2013 | Chen Ma | |
| 2014/0026187 A1 * | 1/2014 | Johnson et al. | 726/3 |
| 2014/0056313 A1 * | 2/2014 | Wada | 370/463 |
| 2014/0201388 A1 | 7/2014 | Dajani et al. | |

OTHER PUBLICATIONS

Author: I. Fette "The Websocket Protocol", Publisher: Isode Ltd., ISSN: 2070-1721; Date: Dec. 2011, pp. 1-71.*

* cited by examiner

*Primary Examiner* — Harunur Rashid
*Assistant Examiner* — Andrew Steinle
(74) *Attorney, Agent, or Firm* — Van Pelt, Yi & James LLP

(57) ABSTRACT

A WebSocket connection is established. The WebSocket connection was established with a requester of the connection. The authentication of the requester is configured to expire. A request to revalidate the authentication is provided. An update of the authentication is received. The update of the authentication is received without disconnecting the WebSocket connection.

20 Claims, 9 Drawing Sheets